US010466444B2

(12) United States Patent
Chen et al.

(10) Patent No.: US 10,466,444 B2
(45) Date of Patent: Nov. 5, 2019

(54) OPTICAL PHOTOGRAPHING LENS ASSEMBLY, IMAGING APPARATUS AND ELECTRONIC DEVICE

(71) Applicant: LARGAN PRECISION CO., LTD., Taichung (TW)

(72) Inventors: Hung-Shuo Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/851,150

(22) Filed: Dec. 21, 2017

(65) Prior Publication Data

US 2019/0086642 A1   Mar. 21, 2019

(30) Foreign Application Priority Data

Sep. 18, 2017   (TW) .............................. 106131966 A

(51) Int. Cl.
*G02B 13/00*    (2006.01)
*G02B 9/62*     (2006.01)
*G02B 13/02*    (2006.01)

(52) U.S. Cl.
CPC ........... *G02B 13/0045* (2013.01); *G02B 9/62* (2013.01); *G02B 13/02* (2013.01)

(58) Field of Classification Search
CPC ... G02B 9/62; G02B 9/64; G02B 9/60; G02B 13/0045; G02B 13/002; G02B 13/02
USPC .................. 359/713, 714, 708, 754–760
See application file for complete search history.

(56) References Cited

U.S. PATENT DOCUMENTS

| 9,417,434 B1 | 8/2016 | Huang | |
|---|---|---|---|
| 2015/0009578 A1* | 1/2015 | Shinohara | G02B 9/64 359/708 |
| 2016/0124192 A1* | 5/2016 | Koreeda | G02B 13/0045 359/713 |
| 2017/0146776 A1* | 5/2017 | Kang | G02B 9/62 |
| 2017/0307849 A1 | 10/2017 | Jhang et al. | |
| 2017/0351061 A1 | 12/2017 | Chang et al. | |
| 2018/0074298 A1* | 3/2018 | Jung | G02B 13/0045 |
| 2018/0188493 A1* | 7/2018 | Huang | G02B 13/0045 |

(Continued)

FOREIGN PATENT DOCUMENTS

| CN | 106226888 A | 12/2016 |
|---|---|---|
| CN | 106873129 A | 6/2017 |

(Continued)

*Primary Examiner* — Jordan M Schwartz
(74) *Attorney, Agent, or Firm* — McClure, Qualey & Rodack, LLP

(57) ABSTRACT

An optical photographing lens assembly includes six lens elements, in order from an object side to an image side, the six lens elements are a first lens element, a second lens element, a third lens element, a fourth lens element, a fifth lens element and a sixth lens element. The first lens element has positive refractive power. The fourth lens element has negative refractive power. The fifth lens element has an object-side surface being concave in a paraxial region thereof. The sixth lens element has an image-side surface being convex in a paraxial region thereof, both an object-side surface and the image-side surface of the seventh lens element are aspheric, and at least one of the object-side surface and the image-side surface of the sixth lens element includes at least one inflection point.

41 Claims, 25 Drawing Sheets

(56) References Cited

U.S. PATENT DOCUMENTS

2018/0188505 A1 7/2018 Chang et al.
2018/0188506 A1 7/2018 Chang et al.

FOREIGN PATENT DOCUMENTS

TW 201706665 A 2/2017
TW M546516 U 8/2017

* cited by examiner

OPTICAL PHOTOGRAPHING LENS ASSEMBLY, IMAGING APPARATUS AND ELECTRONIC DEVICE

RELATED APPLICATIONS

This application claims priority to Taiwan Application Serial Number 106131966, filed Sep. 18, 2017, which is herein incorporated by reference.

BACKGROUND

Technical Field

The present disclosure relates to an optical photographing lens assembly and an imaging apparatus. More particularly, the present disclosure relates to an optical photographing lens assembly and an imaging apparatus, each of which is featured with a compact size and is applicable to electronic devices.

Description of Related Art

With the broadening application of photographing modules, the installation of the photographing modules in various intelligent electronic products, car electronics, identification system, entertainment devices, fitness devices and smart home systems is an upward trend of future technical development. To achieve more application, intelligent electronic products with one, two, even three or more lens assemblies become a trend in marketing. There are developments of lens systems with different property for various applications.

Recently, popular designs including two or more lens assemblies with different field of view (such as a wide-angle lens assembly and a telephoto lens assembly) can achieve both optical zoom effect and electronic zoom effect by image processing. Due to large differences between each lens assemblies and requirements of high quality such as large aperture and compactness, conventional telephoto lens assembly gradually cannot reach the requirements (such as short total track length, large aperture, high image quality and compactness) at the same time, so that a solution with different optical configuration is needed.

SUMMARY

According to one aspect of the present disclosure, an optical photographing lens assembly includes six lens elements, in order from an object side to an image side, the six lens elements are a first lens element, a second lens element, a third lens element, a fourth lens element, a fifth lens element and a sixth lens element. The first lens element has positive refractive power. The fourth lens element has negative refractive power. The fifth lens element has an object-side surface being concave in a paraxial region thereof. The sixth lens element has an image-side surface being convex in a paraxial region thereof, at least one of an object-side surface and the image-side surface of the sixth lens element includes at least one inflection point. When a focal length of the second lens element is f2, a focal length of the fourth lens element is f4, a focal length of the optical photographing lens assembly is f, an axial distance between an object-side surface of the first lens element and an image surface is TL, and a total number of lens elements having Abbe numbers less than 40 is V40, the following conditions are satisfied:

$-0.90 < f4/|f2| \leq 0;$ $0.50 < TL/f < 1.0;$ and $3 \leq V40.$

According to another aspect of the present disclosure, an imaging apparatus includes the optical photographing lens assembly according to the aforementioned aspect and an image sensor, wherein the image sensor is disposed on the image surface of the optical photographing lens assembly.

According to further another aspect of the present disclosure, an electronic device includes the imaging apparatus according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
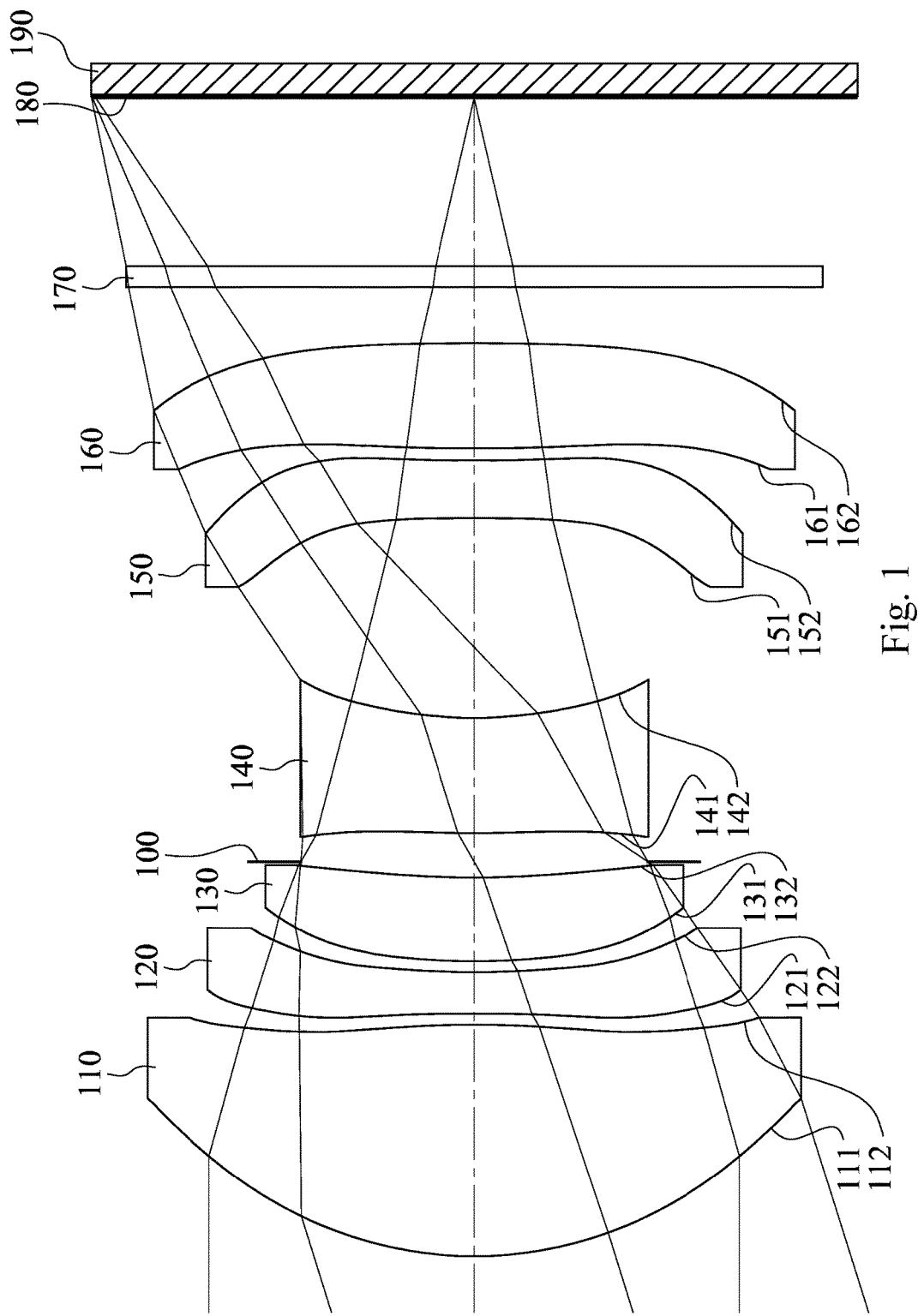
FIG. 1 is a schematic view of an imaging apparatus according to the 1st embodiment of the present disclosure.

An optical photographing lens assembly includes six lens elements, in order from an object side to an image side, the six lens elements are a first lens element, a second lens element, a third lens element, a fourth lens element, a fifth lens element and a sixth lens element.

The first lens element has positive refractive power. Therefore, a total track length of the optical photographing lens assembly can be reduced.

The third lens element can have an object-side surface being convex in a paraxial region thereof and an image-side surface being concave in a paraxial region thereof. Therefore, astigmatism of the optical photographing lens assembly can be corrected.

The fourth lens element has negative refractive power. Therefore, aberrations of the optical photographing lens assembly can be corrected. The fourth lens element can have an image-side surface being concave in a paraxial region thereof. Therefore, the relative illumination in a peripheral region of an image surface can be enhanced by cooperation between the fourth lens element and lens elements in the object side. Moreover, the image-side surface of the fourth lens element can have at least one concave shape in an off-axis region thereof. Therefore, the area of the region with enhanced illumination can be expanded.

The fifth lens element has an object-side surface being concave in a paraxial region thereof. Therefore, high-order aberrations can be favorably corrected. Moreover, the fifth lens element can have positive refractive power. Therefore, sufficient light converging capability of the optical photographing lens assembly can be provided such that the total track length of the optical photographing lens assembly can be favorably reduced and a compact size can be achieved.

The sixth lens element has an image-side surface being convex in a paraxial region thereof. Therefore, a sufficient back focal length can be provided, such that the illumination on the image surface can be enhanced and the mechanism can be designed more flexibly. In addition, at least one of an object-side surface and the image-side surface of the sixth lens element can include at least one inflection point in an off-axis region thereof. Therefore, off-axis aberrations can be favorably corrected. Moreover, the sixth lens element can have negative refractive power, and at least one of the object-side surface and the image-side surface of the sixth lens element can include at least one critical point. Therefore, the peripheral aberration can further be corrected to increase the image quality.

Moreover, at least one lens element of the fifth lens element and the sixth lens element has positive refractive power and an Abbe number less than 30. Therefore, a balance between astigmatism and chromatic aberration can be favorably achieved. Preferably, the at least one lens element has the Abbe number less than 20.

When a focal length of the second lens element is f2, and a focal length of the fourth lens element is f4, the following condition can be satisfied: $-0.90<f4/|f2|\leq 0$. Therefore, a distribution of the negative refractive power of the optical photographing lens assembly can be concentrated on the fourth lens element which is closer to the image surface so as to correct aberrations of the optical photographing lens assembly. Preferably, the following condition can be satisfied: $-0.70<f4/|f2|\leq 0$.

When a focal length of the optical photographing lens assembly is f, and an axial distance between an object-side surface of the first lens element and the image surface is TL, the following condition can be satisfied: $0.50<TL/f<1.0$. Therefore, a telephoto property can be enhanced with power distribution of the fourth lens element, and image quality in a peripheral region can also be increased favorably for designs with large apertures. Preferably, the following condition can be satisfied: $0.75<TL/f<1.0$.

When a total number of lens elements having Abbe numbers less than 40 is V40, the following condition can be satisfied: $3\leq V40$. Therefore, a balance between astigmatism and chromatic aberration can be favorably achieved. Preferably, when a total number of lens elements having Abbe numbers less than 30 is V30, the following condition can be satisfied: $3\leq V30$. More preferably, when a total number of lens elements having Abbe numbers less than 25 is V25, the following condition can be satisfied: $2\leq V25$.

When an axial distance between the object-side surface of the first lens element and the image-side surface of the sixth lens element is Td, and an axial distance between the image-side surface of the sixth lens element and the image surface is BL, the following condition can be satisfied: $2.5<Td/BL<10$. Therefore, the back focal length of the optical photographing lens assembly can be reduced so as to achieve a compact size and obtain an easier cooperation with other wide-angle lens assemblies. Preferably, the following condition can be satisfied: $4.0<Td/BL<8.0$.

Maximum effective radii of an object-side surface and the image-side surface of the fourth lens element have smaller values than maximum effective radii of object-side surfaces and image-side surfaces of the first lens element, the second lens element, the third lens element, the fifth lens element and the sixth lens element. Therefore, diameter of the optical photographing lens assembly can be limited such that a compact size can be achieved and the optical photographing lens assembly can be applied to thinner electronic devices. Specifically, when the maximum effective radius of the object-side surface of the first lens element is Y11, the maximum effective radius of the image-side surface of the first lens element is Y12, the maximum effective radius of the object-side surface of the second lens element is Y21, the maximum effective radius of the image-side surface of the second lens element is Y22, the maximum effective radius of the object-side surface of the third lens element is Y31, the maximum effective radius of the image-side surface of the third lens element is Y32, the maximum effective radius of the object-side surface of the fourth lens element is Y41, the maximum effective radius of the image-side surface of the fourth lens element is Y42, the maximum effective radius of the object-side surface of the fifth lens element is Y51, the maximum effective radius of the image-side surface of the fifth lens element is Y52, the maximum effective radius of the object-side surface of the sixth lens element is Y61, and the maximum effective radius of the image-side surface of the sixth lens element is Y62, the following conditions can be satisfied: Y41/Y11<1.0; Y41/Y12<1.0; Y41/Y21<1.0; Y41/Y22<1.0; Y41/Y31<1.0; Y41/Y32<1.0; Y41/Y51<1.0; Y41/Y52<1.0; Y41/Y61<1.0; Y41/Y62<1.0; Y42/Y11<1.0; Y42/Y12<1.0; Y42/Y21<1.0; Y42/Y22<1.0; Y42/Y31<1.0; Y42/Y32<1.0; Y42/Y51<1.0; Y42/Y52<1.0; Y42/Y61<1.0; and Y42/Y62<1.0.

When a focal length of the third lens element is f3, the focal length of the fourth lens element is f4, a focal length of the fifth lens element is f5, and a focal length of the sixth lens element is f6, the following conditions can be satisfied: $-1.0<f4/|f3|<0$; $-1.0<f4/|f5|<0$; and $-1.0<f4/|f6|<0$. Therefore, the refractive power of the fourth lens element can be further increased.

When a sum of axial distances between every adjacent lens elements of the optical photographing lens assembly is ΣAT, an axial distance between the third lens element and the fourth lens element is T34, and an axial distance between the fourth lens element and the fifth lens element is T45, the following condition can be satisfied: $1.0<\Sigma AT/(T34+T45)<1.25$. Therefore, a sufficient distance between lens elements closed to the object side and lens elements closed to the image side can be ensured, such that limitations of effective radii can be released so as to avoid problems caused by huge change of refraction such as surface reflection, and necessary image quality in a compact module can be achieved easily.

When the axial distance between the image-side surface of the sixth lens element and the image surface is BL, the axial distance between the third lens element and the fourth lens element is T34, and the axial distance between the fourth lens element and the fifth lens element is T45, the following condition can be satisfied: $BL/(T34+T45)<1.25$. Therefore, sufficient distances between the object side and the image side of the fourth lens element can be ensured to provide higher image quality.

When the maximum effective radius of the object-side surface of the first lens element is Y11, and the maximum effective radius of the image-side surface of the sixth lens element is Y62, the following condition can be satisfied: 0.80<Y11/Y62<1.05. Therefore, diameter of the optical photographing lens assembly can be limited to achieve a compact size, so that the optical photographing lens assembly can be applied to thin electronic devices.

When the focal length of the optical photographing lens assembly is f, and a curvature radius of the image-side surface of the fourth lens element is R8, the following condition can be satisfied: 2.5<f/R8<4.0. Therefore, the relative illumination on the peripheral region of the image surface can be enhanced by cooperation between the fourth lens element and lens elements in the object side.

When a displacement in parallel with an optical axis from an axial vertex on the object-side surface of the first lens element to a maximum effective radius position of the object-side surface of the first lens element is Sag11, and a central thickness of the first lens element is CT1, the following condition can be satisfied: 0.60<Sag11/CT1<1.10. Therefore, sufficient thickness in an off-axis region of the first lens element can be ensured so as to avoid the shape of the first lens element from being overly curved for designs with large apertures.

When the displacement in parallel with the optical axis from the axial vertex on the object-side surface of the first lens element to the maximum effective radius position of the object-side surface of the first lens element is Sag11, and a curvature radius of the object-side surface of the first lens element is R1, the following condition can be satisfied: 0.30<Sag11/R1<0.50. Therefore, proper thickness in the off-axis region of the first lens element can be ensured such that overly curved shape of the object-side surface of the first lens element can be avoid and the manufacturing yield can be increased.

When the focal length of the optical photographing lens assembly is f, and a maximum image height of the optical photographing lens assembly is ImgH, the following condition can be satisfied: 2.5<f/ImgH<4.5. Therefore, the telephoto property of the optical photographing lens assembly can be enhanced to function corporately with more photographing modes.

When a maximum field of view of the optical photographing lens assembly is FOV, the following condition can be satisfied: 20 degrees<FOV<50 degrees. Therefore, the telephoto property of the optical photographing lens assembly can further be enhanced.

When an f-number of the optical photographing lens assembly is Fno, the following condition can be satisfied: 1.20<Fno<2.50. Therefore, sufficient and proper illumination on the image surface can be ensured. Preferably, the following condition can be satisfied: 1.40<Fno<2.30.

When the axial distance between the object-side surface of the first lens element and the image surface is TL, the following condition can be satisfied: TL<7.0 mm. Therefore, a compact size of the optical photographing lens assembly can be maintained.

When a maximum of refractive indexes of all the lens elements of the optical photographing lens assembly is Nmax, the following condition can be satisfied: Nmax<1.75. Therefore, a balance between refractive powers and caused aberrations of each lens elements can be achieved.

Each of the aforementioned features of the optical photographing lens assembly can be utilized in numerous combinations, so as to achieve the corresponding functionality.

According to the optical photographing lens assembly of the present disclosure, the lens elements thereof can be made of a plastic material or a glass material. When the lens elements are made of a plastic material, the manufacturing cost can be effectively reduced. When the lens elements are made of a glass material, the arrangement of the refractive power of the optical photographing lens assembly may be more flexible to design. Furthermore, surfaces of each lens element can be arranged to be aspheric (ASP), since the aspheric surface of the lens element is easy to form a shape other than spherical surface so as to have more controllable variables for eliminating aberrations thereof, and to further decrease the required number of the lens elements. Therefore, the total track length of the optical photographing lens assembly can also be reduced.

According to the optical photographing lens assembly of the present disclosure, when a lens surface is aspheric, it means the lens surface has an aspheric shape throughout its optically effective area, or a portion(s) thereof.

According to the optical photographing lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the optical photographing lens assembly of the present disclosure, the refractive power of a lens element being positive or negative or the focal length of the lens element may refer to the refractive power or the focal length in the paraxial region of the lens element.

According to the optical photographing lens assembly of the present disclosure, the optical photographing lens assembly can include at least one stop for eliminating the stray light and thereby improving the image resolution thereof.

According to the optical photographing lens assembly of the present disclosure, the image surface, depending on the corresponding image sensor, can be a planar surface or a curved surface with any curvature, particularly a curved surface being concave toward the object side.

According to the optical photographing lens assembly of the present disclosure, at least one image correcting element (such as a field flattener) can be selectively disposed between a lens element closet to the image surface and the image surface so as to correct image aberration (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the optical photographing lens assembly of the present disclosure, an aperture stop can be configured as a front stop or a middle stop. A front stop disposed between an imaged object and the first lens element can provide a longer distance between an exit pupil of the optical photographing lens assembly and the image surface to enable a telecentric effect, and thereby can improve the image-sensing efficiency of an image sensor. A middle stop disposed between the first lens element and the image surface is favorable for enlarging the field of view of the optical photographing lens assembly and thereby provides a wider field of view for the same.

According to the optical photographing lens assembly of the present disclosure, a critical point is a non-axial point of the lens surface where its tangent is perpendicular to the optical axis.

According to the optical photographing lens assembly of the present disclosure, an inflection point is a point on a curve of a lens surface ranging from a paraxial region to an off-axis region of the lens surface where the center of curvature of the curve changes from the object side to the image side (or from the image side to the object side).

According to the optical photographing lens assembly of the present disclosure, the optical photographing lens assembly can be applied to 3D (three-dimensional) image capturing applications, in products such as digital cameras, mobile devices, digital tablets, smart TVs, network monitoring devices, motion sensing input devices, driving recorders, rear view camera systems, wearable devices, unmanned aerial vehicles and other electronic imaging products.

According to the present disclosure, an imaging apparatus is provided. The imaging apparatus includes the aforementioned optical photographing lens assembly according to the present disclosure and an image sensor, wherein the image sensor is disposed on or near the image surface of the aforementioned optical photographing lens assembly. With the proper distribution of negative power of the optical photographing lens assembly concentrating on the fourth lens element which is closer to the image surface, the telephoto property of the optical photographing lens assembly can be enhanced. Meanwhile, image quality in a peripheral region can also be increased for designs with large apertures. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Preferably, the electronic device can further include, but not limited to, a control unit, a display, a storage unit, a random access memory unit (RAM) or a combination thereof.

According to the above description of the present disclosure, the following 1st-13th specific embodiments are provided for further explanation.

1st Embodiment

Figure 2:
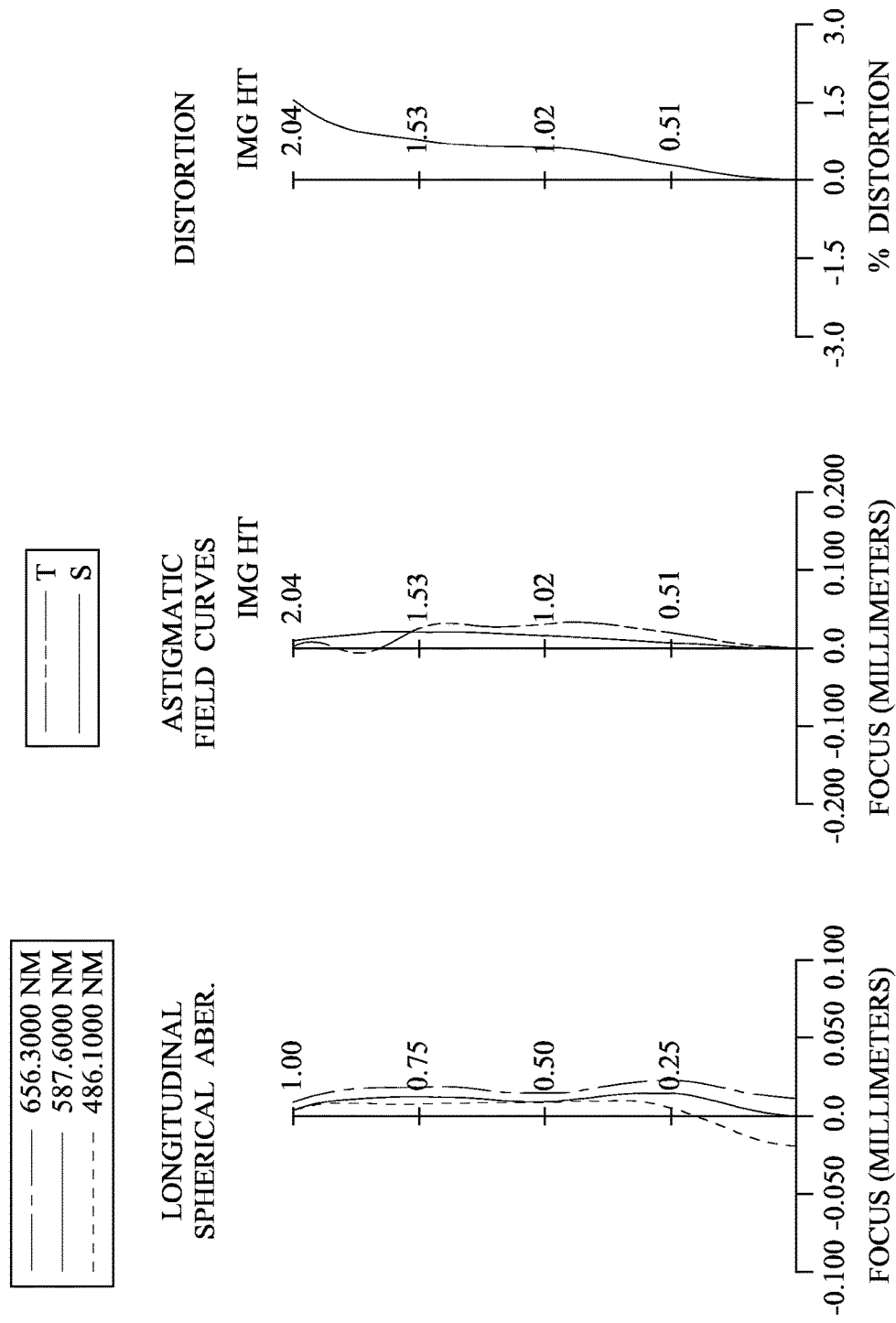
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an optical photographing lens assembly (its reference numeral is omitted) and an image sensor 190. The optical photographing lens assembly includes, in order from an object side to an image side, a first lens element 110, a second lens element 120, a third lens element 130, an aperture stop 100, a fourth lens element 140, a fifth lens element 150, a sixth lens element 160, an IR-cut filter 170 and an image surface 180. The image sensor 190 is disposed on the image surface 180 of the optical photographing lens assembly. The optical photographing lens assembly includes six lens elements (110, 120, 130, 140, 150 and 160) without additional one or more lens elements inserted between the first lens element 110 and the sixth lens element 160.

The first lens element 110 with positive refractive power has an object-side surface 111 being convex in a paraxial region thereof and an image-side surface 112 being convex in a paraxial region thereof. The first lens element 110 is made of a plastic material, and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with negative refractive power has an object-side surface 151 being concave in a paraxial region thereof and an image-side surface 152 being plano in a paraxial region thereof. The fifth lens element 150 is made of a plastic material, and has the object-side surface 151 and the image-side surface 152 being both aspheric.

The sixth lens element 160 with positive refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric. Furthermore, the object-side surface 161 of the sixth lens element 160 includes at least one inflection point and at least one critical point in an off-axis region thereof.

The IR-cut filter 170 is made of a glass material and located between the sixth lens element 160 and the image surface 180, and will not affect the focal length of the optical photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing lens assembly according to the 1st embodiment, when a focal length of the optical photographing lens assembly is f, an f-number of the optical photographing lens assembly is Fno, and half of a maximum field of view of the optical photographing lens assembly is HFOV, these parameters have the following values: f=6.36 mm; Fno=2.25; and HFOV=17.5 degrees.

In the optical photographing lens assembly according to the 1st embodiment, when the maximum field of view of the optical photographing lens assembly is FOV, the following condition is satisfied: FOV=35.00 degrees.

In the optical photographing lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, and a maximum of the refractive indexes of all the lens elements of the optical photographing lens assembly is Nmax, that is, the maximum of N1, N2, N3, N4, N5 and N6 is Nmax (i.e., the refractive index N6 of the sixth lens element 160 in the 1st embodiment), the following condition is satisfied: Nmax=1.681.

In the optical photographing lens assembly according to the 1st embodiment, when a total number of lens elements having Abbe numbers less than 40 is V40, a total number of lens elements having Abbe numbers less than 30 is V30, and a total number of lens elements having Abbe numbers less than 25 is V25, the following conditions are satisfied: V40=3; V30=3; and V25=1. Specifically, in the 1st embodiment, the lens elements having Abbe numbers less than 40 and less than 30 are the second lens element 120, the fourth lens element 140 and the sixth lens element 160, the lens element having an Abbe number less than 25 is the sixth lens element 160.

Figure 19:
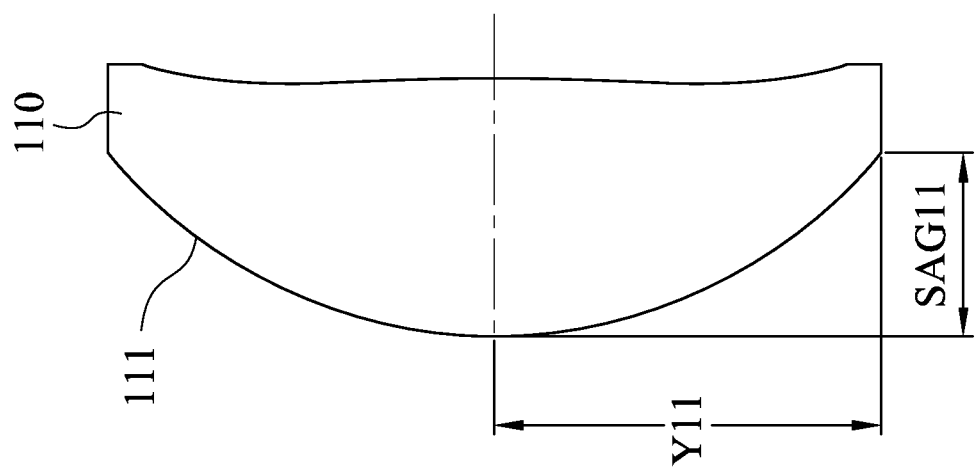
FIG. 19 is a schematic view showing parameters of the first lens element of the imaging apparatus according to the 1st embodiment in FIG. 1.

FIG. 19 is a schematic view showing parameters of the first lens element 110 of the imaging apparatus according to the 1st embodiment in FIG. 1. In the optical photographing lens assembly according to the 1st embodiment, when a displacement in parallel with an optical axis from an axial vertex on the object-side surface 111 of the first lens element 110 to a maximum effective radius position of the object-side surface 111 of the first lens element 110 is Sag11, and a central thickness of the first lens element 110 is CT1, the following condition is satisfied: Sag11/CT1=0.68.

In the optical photographing lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and a sum of the axial distances between every adjacent lens elements of the optical photographing lens assembly is ΣAT (i.e., ΣAT=T12+T23+T34+T45+T56), the following condition is satisfied: ΣAT/(T34αT45)=1.14.

In the optical photographing lens assembly according to the 1st embodiment, when an axial distance between the image-side surface 162 of the sixth lens element 160 and the image surface 180 is BL, the axial distance between the third lens element 130 and the fourth lens element 140 is T34, the axial distance between the fourth lens element 140 and the fifth lens element 150 is T45, and an axial distance between the object-side surface 111 of the first lens element 110 and the image-side surface 162 of the sixth lens element 160 is Td, the following conditions are satisfied: BL/(T34+T45)=1.01; and Td/BL=3.69.

In the optical photographing lens assembly according to the 1st embodiment, when an axial distance between the object-side surface 111 of the first lens element 110 and the image surface 180 is TL, and the focal length of the optical photographing lens assembly is f, the following conditions are satisfied: TL=6.19 mm; and TL/f=0.97.

Referring back to FIG. 19, in the optical photographing lens assembly according to the 1st embodiment, when a maximum effective radius of the object-side surface 111 of the first lens element 110 is Y11, and a maximum effective radius of the image-side surface 162 of the sixth lens element 160 is Y62, the following condition is satisfied: Y11/Y62=1.02.

In the optical photographing lens assembly according to the 1st embodiment, maximum effective radii of the object-side surface 141 and the image-side surface 142 of the fourth lens element 140 have smaller values than maximum effective radii of the object-side surfaces and the image-side surfaces of the first lens element 110, the second lens element 120, the third lens element 130, the fifth lens element 150 and the sixth lens element 160. Specifically, in the optical photographing lens assembly according to the 1st embodiment, when the maximum effective radius of the object-side surface 111 of the first lens element 110 is Y11, the maximum effective radius of the image-side surface 112 of the first lens element 110 is Y12, the maximum effective radius of the object-side surface 121 of the second lens element 120 is Y21, the maximum effective radius of the image-side surface 122 of the second lens element 120 is Y22, the maximum effective radius of the object-side surface 131 of the third lens element 130 is Y31, the maximum effective radius of the image-side surface 132 of the third lens element 130 is Y32, the maximum effective radius of the object-side surface 141 of the fourth lens element 140 is Y41, the maximum effective radius of the image-side surface 142 of the fourth lens element 140 is Y42, the maximum effective radius of the object-side surface 151 of the fifth lens element 150 is Y51, the maximum effective radius of the image-side surface 152 of the fifth lens element 150 is Y52, the maximum effective radius of the object-side surface 161 of the sixth lens element 160 is Y61, and the maximum effective radius of the image-side surface 162 of the sixth lens element 160 is Y62, the following conditions are satisfied: Y41/Y11=0.53; Y41/Y12=0.60; Y41/Y21=0.64; Y41/Y22=0.77; Y41/Y31=0.82; Y41/Y32=0.96; Y41/Y51=0.73; Y41/Y52=0.64; Y41/Y61=0.58; Y41/Y62=0.53; Y42/Y11=0.53; Y42/Y12=0.61; Y42/Y21=0.65; Y42/Y22=0.78; Y42/Y31=0.83; Y42/Y32=0.97; Y42/Y51=0.74; Y42/Y52=0.65; Y42/Y61=0.59; and Y42/Y62=0.54.

In the optical photographing lens assembly according to the 1st embodiment, when the displacement in parallel with the optical axis from the axial vertex on the object-side surface 111 of the first lens element 110 to the maximum effective radius position of the object-side surface 111 of the first lens element 110 is Sag11, and a curvature radius of the object-side surface 111 of the first lens element 110 is R1, the following condition is satisfied: Sag11/R1=0.41.

In the optical photographing lens assembly according to the 1st embodiment, when the focal length of the optical photographing lens assembly is f, and a curvature radius of the image-side surface 142 of the fourth lens element 140 is R8, the following condition is satisfied: f/R8=2.78.

In the optical photographing lens assembly according to the 1st embodiment, when a focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following conditions are satisfied: f4/|f2|=−0.85; f4/|f3|=−0.05; f4/|f5|=−0.18; and f4/|f6|=−0.16.

In the optical photographing lens assembly according to the 1st embodiment, when the focal length of the optical photographing lens assembly is f, and a maximum image height of the optical photographing lens assembly is ImgH, the following condition is satisfied: f/ImgH=3.12.

The detailed optical data of the 1st embodiment are shown in TABLE 1 and the aspheric surface data are shown in TABLE 2 below.

TABLE 1

1st Embodiment
f = 6.36 mm, Fno = 2.25, HFOV = 17.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.064 | ASP | 1.235 | Plastic | 1.545 | 56.1 | 3.11 |
| 2 | | −7.465 | ASP | 0.060 | | | | |
| 3 | Lens 2 | −30.550 | ASP | 0.220 | Plastic | 1.584 | 28.2 | −7.12 |
| 4 | | 4.829 | ASP | 0.060 | | | | |
| 5 | Lens 3 | 4.561 | ASP | 0.447 | Plastic | 1.544 | 56.0 | 124.30 |
| 6 | | 4.722 | ASP | 0.085 | | | | |
| 7 | Ape. Stop | Plano | | 0.152 | | | | |
| 8 | Lens 4 | 6.554 | ASP | 0.614 | Plastic | 1.614 | 26.0 | −6.05 |
| 9 | | 2.287 | ASP | 1.067 | | | | |
| 10 | Lens 5 | −17.955 | ASP | 0.308 | Plastic | 1.544 | 56.0 | −33.00 |
| 11 | | ∞ | ASP | 0.064 | | | | |
| 12 | Lens 6 | −100.000 | ASP | 0.561 | Plastic | 1.681 | 18.6 | 38.56 |
| 13 | | −20.846 | ASP | 0.300 | | | | |
| 14 | IR-cut filter | Plano | | 0.110 | Glass | 1.517 | 64.2 | — |
| 15 | | Plano | | 0.909 | | | | |
| 16 | Image | Plano | | — | | | | |

Reference wavelength is 587.6 nm (d-line).

TABLE 2

| Aspheric Coefficients | | | | | | |
|---|---|---|---|---|---|---|
| Surface # | 1 | 2 | 3 | 4 | 5 | 6 |
| k = | −1.0409E−01 | −6.0723E+01 | −1.8424E+01 | 7.5269E−01 | 1.2693E+01 | −9.9000E+01 |
| A4 = | −2.7106E−03 | −1.1871E−01 | −2.3143E−01 | −4.4389E−02 | 1.1556E−01 | 2.9863E−02 |
| A6 = | −5.3834E−04 | 3.0883E−01 | 5.3156E−01 | −2.7032E−02 | −2.5899E−01 | −5.4703E−02 |
| A8 = | 4.8224E−04 | −2.4013E−01 | −4.0857E−01 | 3.7249E−01 | 4.6339E−01 | 1.5282E−02 |
| A10 = | −9.6809E−05 | 8.1255E−02 | 1.3651E−01 | −3.7790E−01 | −3.1265E−01 | 7.7034E−02 |
| A12 = | −6.3490E−05 | −1.0084E−02 | −1.5699E−02 | 1.1231E−01 | 6.4210E−02 | −6.2498E−02 |

| Surface # | 8 | 9 | 10 | 11 | 12 | 13 |
|---|---|---|---|---|---|---|
| k = | 4.2997E+01 | 3.4318E+00 | −9.0284E+01 | 0.0000E+00 | 9.0000E+01 | −5.6390E+01 |
| A4 = | −2.1555E−01 | −1.2324E−01 | −9.5941E−02 | 3.6536E−01 | 3.3023E−01 | −8.1561E−03 |
| A6 = | 1.4332E−01 | 1.0875E−01 | −1.1158E−01 | −1.1663E+00 | −8.4278E−01 | −5.9530E−02 |
| A8 = | −6.2372E−02 | −2.5967E−02 | −3.5643E−02 | 1.3808E+00 | 9.7280E−01 | 5.5036E−02 |
| A10 = | −1.5647E−01 | −1.0241E−01 | 3.4539E−01 | −8.9830E−01 | −6.2756E−01 | −2.1988E−02 |

TABLE 2-continued

| Aspheric Coefficients | | | | | |
|---|---|---|---|---|---|
| A12 = | 2.9304E−01 | 1.8598E−01 | −4.6441E−01 | 3.1516E−01 | 2.2898E−01 | 3.0287E−03 |
| A14 = | −1.7693E−01 | −9.3295E−02 | 2.6214E−01 | −5.3286E−02 | −4.4208E−02 | 1.9140E−04 |
| A16 = | | | −5.2662E−02 | 3.1257E−03 | 3.5189E−03 | −5.6412E−05 |

In TABLE 1, the curvature radius, the thickness and the focal length are shown in millimeters (mm). Surface numbers 0-16 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
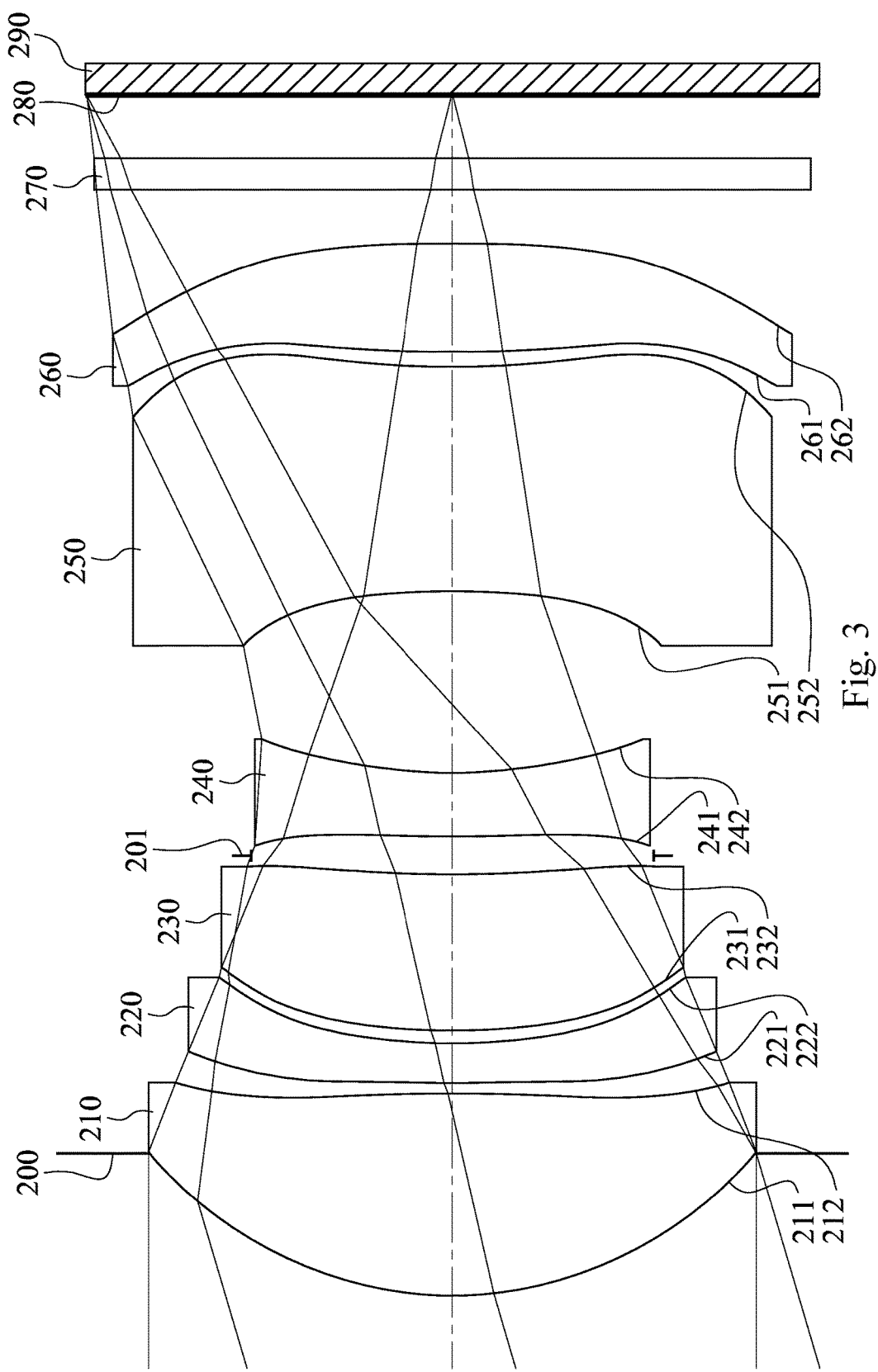
FIG. 3 is a schematic view of an imaging apparatus according to the 2nd embodiment of the present disclosure.
Figure 4:
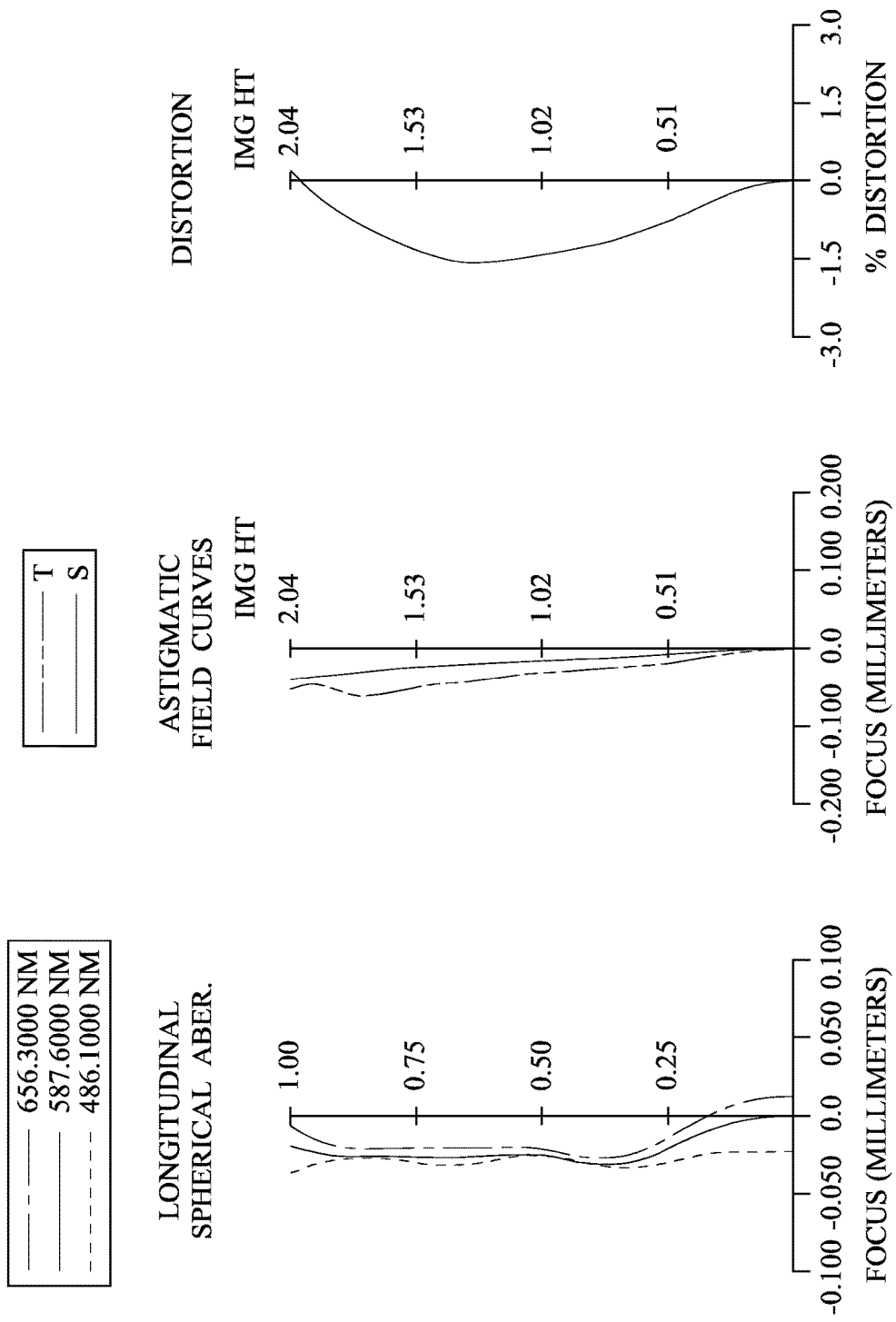
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an optical photographing lens assembly (its reference numeral is omitted) and an image sensor 290. The optical photographing lens assembly includes, in order from an object side to an image side, an aperture stop 200, a first lens element 210, a second lens element 220, a third lens element 230, a stop 201, a fourth lens element 240, a fifth lens element 250, a sixth lens element 260, an IR-cut filter 270 and an image surface 280. The image sensor 290 is disposed on the image surface 280 of the optical photographing lens assembly. The optical photographing lens assembly includes six lens elements (210, 220, 230, 240, 250 and 260) without additional one or more lens elements inserted between the first lens element 210 and the sixth lens element 260.

The first lens element 210 with positive refractive power has an object-side surface 211 being convex in a paraxial region thereof and an image-side surface 212 being convex in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of a plastic material, and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of a plastic material, and has the object-side surface 261 and the image-side surface 262 being both aspheric. Furthermore, each of the object-side surface 261 and the image-side surface 262 of the sixth lens element 260 includes at least one inflection point in an off-axis region thereof, the object-side surface 261 of the sixth lens element 260 includes at least one critical point in the off-axis region thereof.

The IR-cut filter 270 is made of a glass material and located between the sixth lens element 260 and the image surface 280, and will not affect the focal length of the optical photographing lens assembly.

The detailed optical data of the 2nd embodiment are shown in TABLE 3 and the aspheric surface data are shown in TABLE 4 below.

TABLE 3

2nd Embodiment
f = 6.93 mm, Fno = 2.05, HFOV = 16.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.795 | | | | |
| 2 | Lens 1 | 2.113 | ASP | 1.128 | Plastic | 1.545 | 56.0 | 5.57 |
| 3 | | −19.852 | ASP | 0.060 | | | | |
| 4 | Lens 2 | 9.506 | ASP | 0.220 | Plastic | 1.603 | 28.5 | −13.31 |
| 5 | | 3.483 | ASP | 0.072 | | | | |
| 6 | Lens 3 | 5.148 | ASP | 0.869 | Plastic | 1.544 | 55.9 | −19.02 |
| 7 | | 8.286 | ASP | 0.104 | | | | |

TABLE 3-continued

2nd Embodiment
f = 6.93 mm, Fno = 2.05, HFOV = 16.4 deg.

| Surface # | | Curvature Radius | | Thickness | Material | Index | Abbe # | Focal Length |
|---|---|---|---|---|---|---|---|---|
| 8 | Stop | Plano | | 0.106 | | | | |
| 9 | Lens 4 | 7.817 | ASP | 0.354 | Plastic | 1.614 | 26.0 | 11.07 |
| 10 | | 2.721 | ASP | 1.014 | | | | |
| 11 | Lens 5 | −5.421 | ASP | 1.250 | Plastic | 1.614 | 26.0 | −18.03 |
| 12 | | 8.135 | ASP | 0.083 | | | | |
| 13 | Lens 6 | 13.473 | ASP | 0.605 | Plastic | 1.681 | 18.6 | 6.48 |
| 14 | | −15.305 | ASP | 0.300 | | | | |
| 15 | IR-cut filter | Plano | | 0.175 | Glass | 1.517 | 64.2 | — |
| 16 | | Plano | | 0.353 | | | | |
| 17 | Image | Plano | | — | | | | |

Reference wavelength is 587.6 nm (d-line).
The maximum effective radius of the surface 8 is 1.120 mm.

TABLE 4

Aspheric Coefficients

| Surface # | 2 | 3 | 4 | 5 | 6 | 7 |
|---|---|---|---|---|---|---|
| k = | −8.1433E−02 | −1.3279E+01 | −9.9000E+01 | 2.7282E+00 | 1.1861E+01 | −9.9000E+01 |
| A4 = | 1.9451E−03 | −9.1227E−02 | −1.7385E−01 | −1.5274E−03 | 1.4762E−01 | 7.4516E−02 |
| A6 = | −9.8066E−03 | 1.8524E−01 | 3.4134E−01 | −1.3427E−02 | −2.6413E−01 | −2.4348E−01 |
| A8 = | 7.6580E−03 | −1.2399E−01 | −2.4546E−01 | 7.2859E−02 | 2.7859E−01 | 3.5676E−01 |
| A10 = | −2.8047E−03 | 3.8676E−02 | 8.4049E−02 | −4.2432E−02 | −1.2307E−01 | −2.5062E−01 |
| A12 = | 3.9716E−04 | −4.5877E−03 | −1.1255E−02 | 6.0610E−03 | 1.7494E−02 | 6.2933E−02 |

| Surface # | 9 | 10 | 11 | 12 | 13 | 14 |
|---|---|---|---|---|---|---|
| k = | 2.9067E+01 | 2.6553E+00 | 1.7785E+01 | 0.0000E+00 | −9.9000E+01 | 5.2676E+01 |
| A4 = | −5.9356E−02 | −7.3980E−02 | −2.4285E−02 | 1.3518E−01 | 7.9041E−02 | −1.0581E−01 |
| A6 = | −2.3428E−01 | −6.9254E−02 | −1.3869E−01 | −2.1455E−01 | −3.2040E−02 | 1.4168E−01 |
| A8 = | 5.2152E−01 | 2.8003E−01 | 2.9470E−01 | 1.1268E−01 | −1.0445E−01 | −1.4802E−01 |
| A10 = | −5.1743E−01 | −3.4736E−01 | −3.8174E−01 | −3.1646E−02 | 1.0559E−01 | 8.3609E−02 |
| A12 = | 2.2683E−01 | 2.0380E−01 | 2.8676E−01 | 4.8657E−03 | −4.2234E−02 | −2.5128E−02 |
| A14 = | −3.4633E−02 | −4.4989E−02 | −1.1577E−01 | −4.9205E−04 | 7.8530E−03 | 3.8077E−03 |
| A16 = | | | 1.9021E−02 | 3.8391E−05 | −5.5880E−04 | −2.2757E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 6.93 | Y41/Y51 | 0.95 |
| Fno | 2.05 | Y41/Y52 | 0.62 |
| HFOV (deg.) | 16.4 | Y41/Y61 | 0.61 |
| FOV | 32.80 | Y41/Y62 | 0.58 |
| Nmax | 1.681 | Y42/Y11 | 0.63 |
| V40 | 4 | Y42/Y12 | 0.69 |
| V30 | 4 | Y42/Y21 | 0.72 |
| V25 | 1 | Y42/Y22 | 0.82 |
| Sag11/CT1 | 0.71 | Y42/Y31 | 0.83 |
| ΣAT/(T34 + T45) | 1.18 | Y42/Y32 | 0.93 |
| BL/(T34 + T45) | 0.68 | Y42/Y51 | 0.91 |
| Td/BL | 7.08 | Y42/Y52 | 0.60 |
| TL (mm) | 6.69 | Y42/Y61 | 0.59 |
| TL/f | 0.97 | Y42/Y62 | 0.56 |
| Y11/Y62 | 0.89 | Sag11/R1 | 0.38 |
| Y41/Y11 | 0.65 | f/R8 | 2.55 |
| Y41/Y11 | 0.71 | f4/|f2| | −0.76 |
| Y41/Y21 | 0.75 | f4/|f3| | −0.31 |
| Y41/Y22 | 0.85 | f4/|f5| | −1.36 |
| Y41/Y31 | 0.86 | f4/|f6| | −0.66 |
| Y41/Y32 | 0.96 | f/ImgH | 3.40 |

3rd Embodiment

Figure 5:
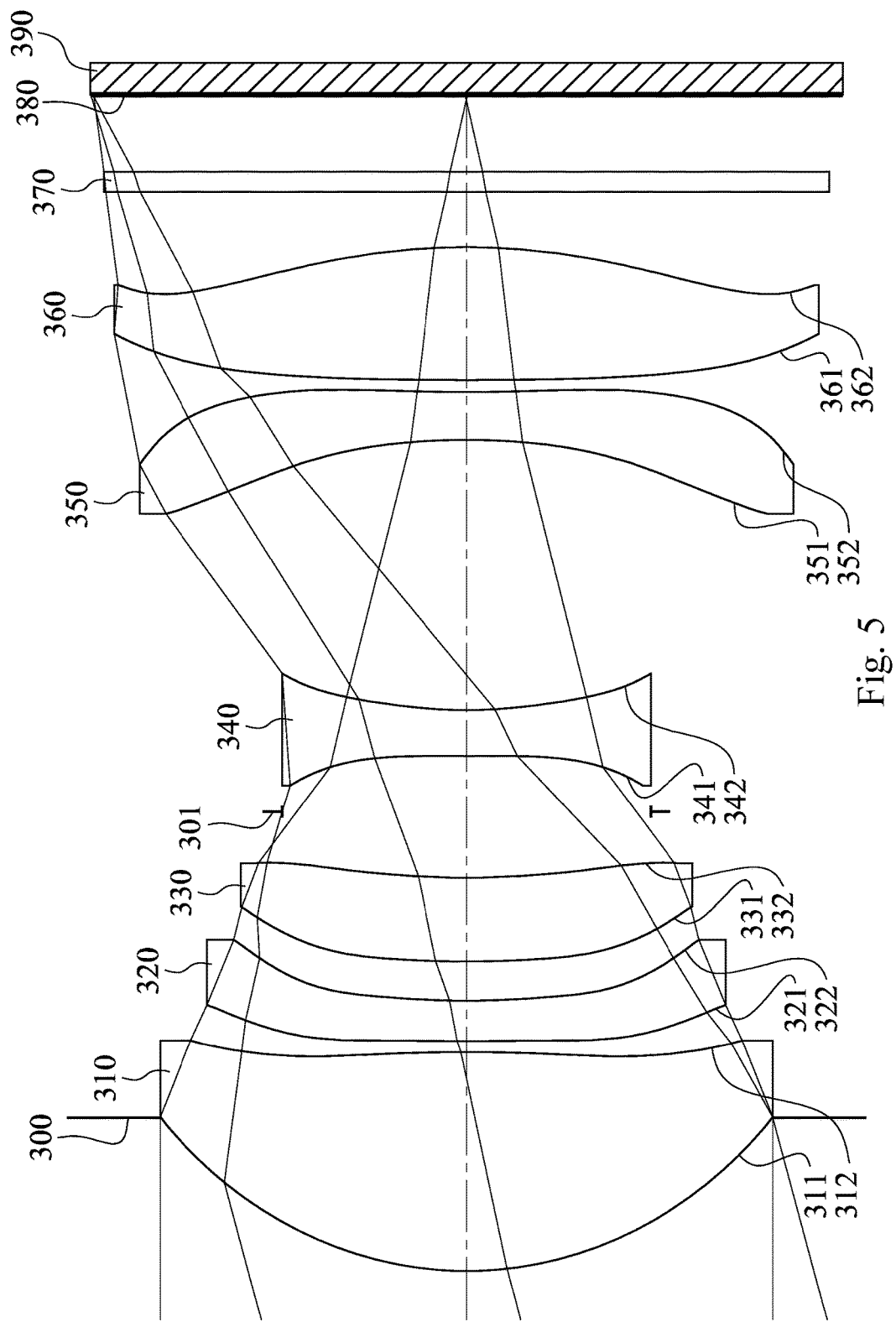
FIG. 5 is a schematic view of an imaging apparatus according to the 3rd embodiment of the present disclosure.
Figure 6:
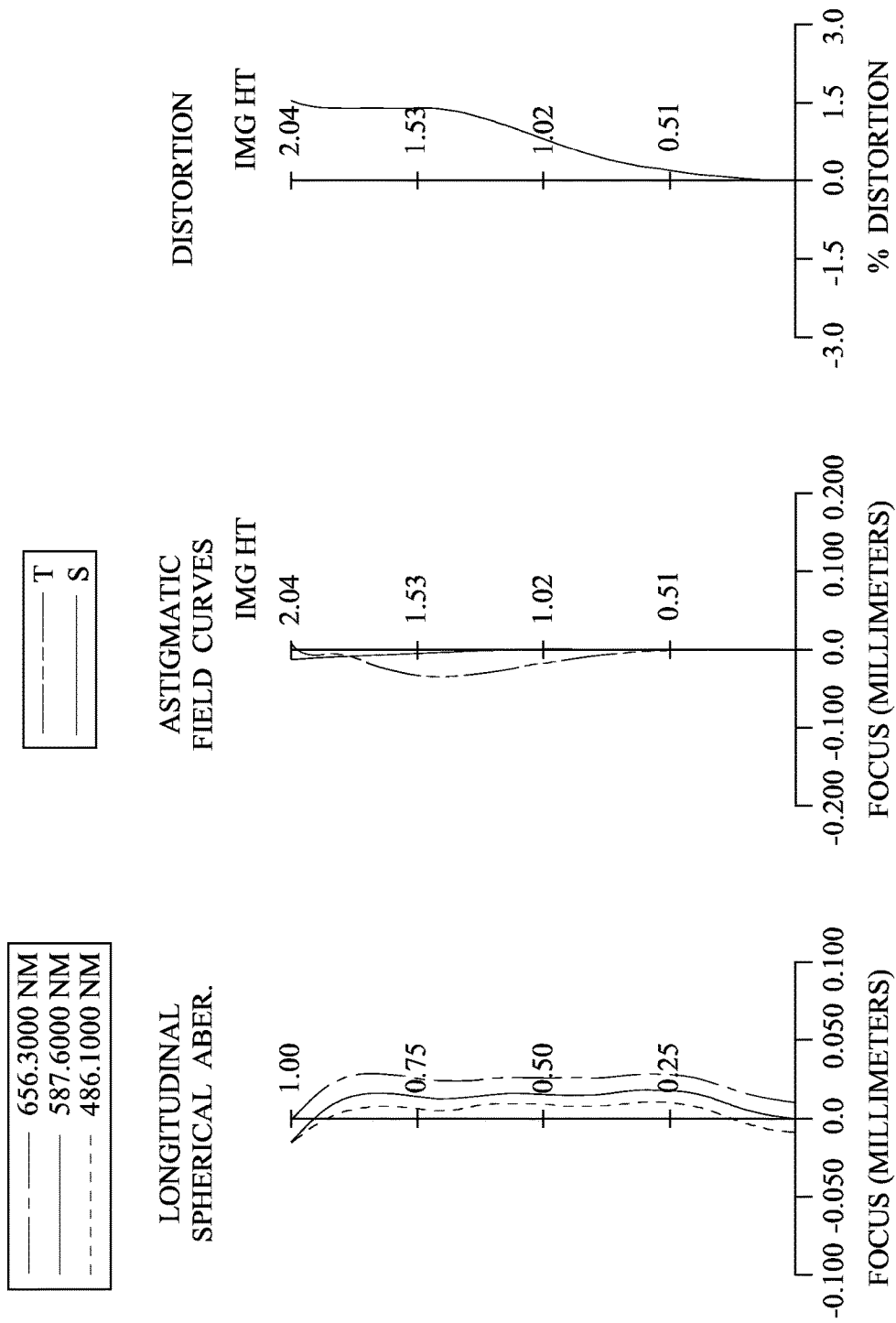
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an optical photographing lens assembly (its reference numeral is omitted) and an image sensor 390. The optical photographing lens assembly includes, in order from an object side to an image side, an aperture stop 300, a first lens element Jo 310, a second lens element 320, a third lens element 330, a stop 301, a fourth lens element 340, a fifth lens element 350, a sixth lens element 360, an IR-cut filter 370 and an image surface 380. The image sensor 390 is disposed on the image surface 380 of the optical photographing lens assembly. The optical photographing lens assembly includes six lens elements (310, 320, 330, 340, 350 and 360) without additional one or more lens elements inserted between the first lens element 310 and the sixth lens element 360.

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with negative refractive power has an object-side surface 351 being concave in a paraxial region thereof and an image-side surface 352 being concave in a paraxial region thereof. The fifth lens element 350 is made of a plastic material, and has the object-side surface 351 and the image-side surface 352 being both aspheric.

The sixth lens element 360 with positive refractive power has an object-side surface 361 being convex in a paraxial region thereof and an image-side surface 362 being convex in a paraxial region thereof. The sixth lens element 360 is made of a plastic material, and has the object-side surface 361 and the image-side surface 362 being both aspheric. Furthermore, the image-side surface 362 of the sixth lens element 360 includes at least one inflection point and at least one critical point in an off-axis region thereof.

The IR-cut filter 370 is made of a glass material and located between the sixth lens element 360 and the image surface 380, and will not affect the focal length of the optical photographing lens assembly.

The detailed optical data of the 3rd embodiment are shown in TABLE 5 and the aspheric surface data are shown in TABLE 6 below.

TABLE 5

3rd Embodiment
f = 7.48 mm, Fno = 2.25, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.831 | | | | |
| 2 | Lens 1 | 1.992 | ASP | 1.188 | Plastic | 1.545 | 56.1 | 3.13 |
| 3 | | −9.293 | ASP | 0.060 | | | | |
| 4 | Lens 2 | 13.932 | ASP | 0.220 | Plastic | 1.669 | 19.5 | −8.87 |
| 5 | | 4.136 | ASP | 0.213 | | | | |
| 6 | Lens 3 | 6.038 | ASP | 0.454 | Plastic | 1.544 | 56.0 | −39.86 |
| 7 | | 4.598 | ASP | 0.360 | | | | |
| 8 | Stop | Plano | | 0.303 | | | | |
| 9 | Lens 4 | 73.402 | ASP | 0.250 | Plastic | 1.584 | 28.2 | −4.53 |
| 10 | | 2.550 | ASP | 1.469 | | | | |
| 11 | Lens 5 | −3.908 | ASP | 0.260 | Plastic | 1.544 | 56.0 | −5.46 |
| 12 | | 12.623 | ASP | 0.064 | | | | |
| 13 | Lens 6 | 35.791 | ASP | 0.724 | Plastic | 1.669 | 19.5 | 5.18 |
| 14 | | −3.801 | ASP | 0.300 | | | | |
| 15 | IR-cut filter | Plano | | 0.110 | Glass | 1.517 | 64.2 | — |
| 16 | | Plano | | 0.418 | | | | |
| 17 | Image | Plano | | — | | | | |

Reference wavelength is 587.6 nm (d-line).
The maximum effective radius of the surface 8 is 1.000 mm.

TABLE 6

Aspheric Coefficients

| Surface # | 2 | 3 | 4 | 5 | 6 | 7 |
|---|---|---|---|---|---|---|
| k = | −4.6241E−02 | −9.8744E+01 | 4.0098E+01 | 1.9383E+00 | 1.5357E+01 | −9.0714E+01 |
| A4 = | −1.2531E−03 | −2.2248E−02 | −1.6038E−01 | −1.9285E−01 | −3.8109E−02 | 8.0531E−02 |
| A6 = | −1.0873E−03 | 9.8951E−02 | 3.3775E−01 | 4.0542E−01 | 2.3032E−01 | −8.3367E−02 |
| A8 = | −9.2024E−05 | −7.2261E−02 | −2.3366E−01 | −2.3655E−01 | −1.8763E−01 | 2.6737E−02 |
| A10 = | −1.5670E−04 | 2.4139E−02 | 7.8178E−02 | 5.8520E−02 | 7.3378E−02 | −1.0571E−02 |
| A12 = | 4.2031E−05 | −3.1295E−03 | −1.1032E−02 | −6.4486E−03 | −1.3921E−02 | 2.3386E−03 |

TABLE 6-continued

Aspheric Coefficients

| Surface # | 9 | 10 | 11 | 12 | 13 | 14 |
|---|---|---|---|---|---|---|
| k = | 9.0000E+01 | 3.0479E+00 | −1.9777E+01 | 4.7712E+01 | −7.4525E+01 | −2.3129E+01 |
| A4 = | −2.2640E−01 | −1.3421E−01 | −7.3181E−02 | −1.5856E−02 | 1.9543E−02 | −6.2252E−02 |
| A6 = | −3.9377E−02 | −4.7079E−02 | −2.3142E−02 | −6.7974E−02 | −1.0555E−02 | 3.6464E−02 |
| A8 = | 3.0868E−01 | 5.2289E−02 | 5.1423E−02 | 5.7764E−02 | 5.7320E−03 | 5.3231E−04 |
| A10 = | −5.5767E−01 | −8.6929E−01 | −1.9209E−02 | −2.5075E−02 | −1.5766E−03 | −9.2391E−03 |
| A12 = | 4.7406E−01 | 7.2376E−01 | 3.7452E−04 | 6.3794E−03 | 2.7772E−04 | 4.3303E−03 |
| A14 = | −1.5612E−01 | −2.4121E−01 | 1.0473E−03 | −1.0722E−03 | −1.3926E−05 | −7.8641E−04 |
| A16 = | | | −1.4429E−04 | 8.6149E−05 | −2.5160E−06 | 4.9753E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 7.48 | Y41/Y51 | 0.59 |
| Fno | 2.25 | Y41/Y52 | 0.54 |
| HFOV (deg.) | 15.0 | Y41/Y61 | 0.50 |
| FOV | 30.00 | Y41/Y62 | 0.51 |
| Nmax | 1.669 | Y42/Y11 | 0.60 |
| V40 | 3 | Y42/Y12 | 0.67 |
| V30 | 3 | Y42/Y21 | 0.71 |
| V25 | 2 | Y42/Y22 | 0.79 |
| Sag11/CT1 | 0.70 | Y42/Y31 | 0.82 |
| ΣAT/(T34 + T45) | 1.16 | Y42/Y32 | 0.88 |
| BL/(T34 + T45) | 0.39 | Y42/Y51 | 0.61 |
| Td/BL | 6.72 | Y42/Y52 | 0.56 |
| TL (mm) | 6.39 | Y42/Y61 | 0.52 |
| TL/f | 0.85 | Y42/Y62 | 0.53 |
| Y11/Y62 | 0.88 | Sag11/R1 | 0.42 |
| Y41/Y11 | 0.58 | f/R8 | 2.93 |
| Y41/Y12 | 0.64 | f4/|f2| | −0.51 |
| Y41/Y21 | 0.68 | f4/|f3| | −0.11 |
| Y41/Y22 | 0.76 | f4/|f5| | −0.83 |
| Y41/Y31 | 0.78 | f4/|f6| | −0.88 |
| Y41/Y32 | 0.84 | f/ImgH | 3.67 |

4th Embodiment

Figure 7:
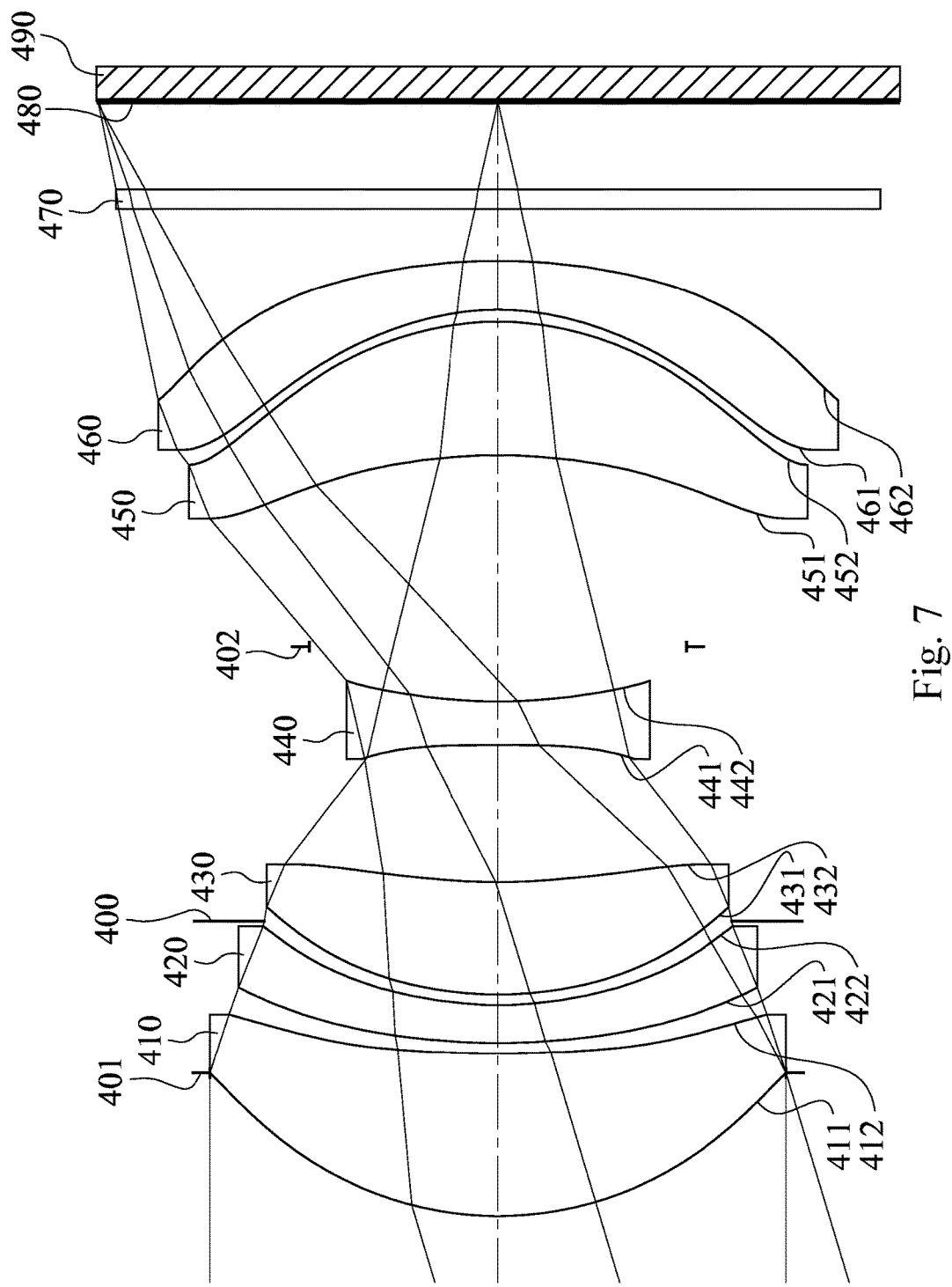
FIG. 7 is a schematic view of an imaging apparatus according to the 4th embodiment of the present disclosure.
Figure 8:
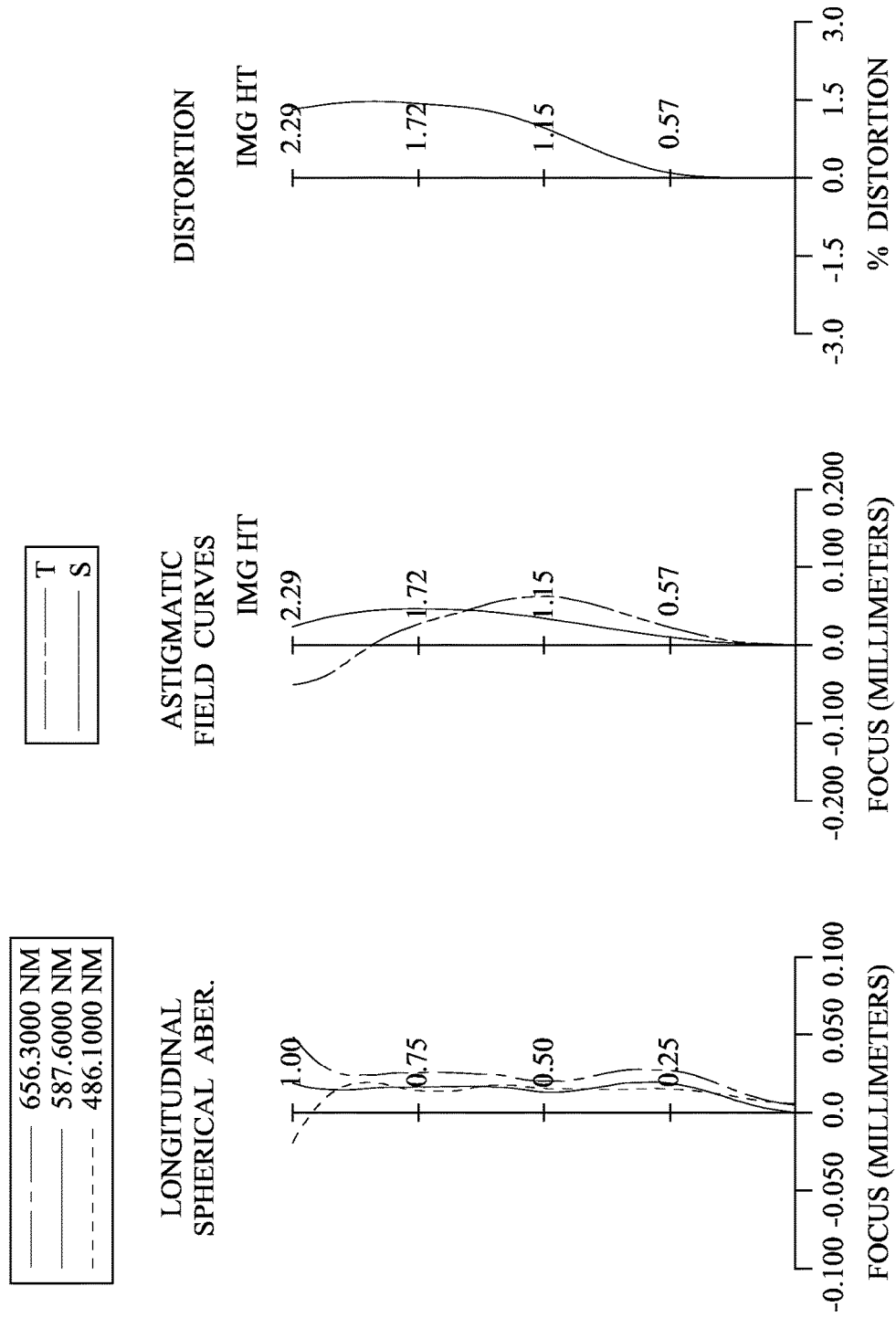
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an optical photographing lens assembly (its reference numeral is omitted) and an image sensor 490. The optical photographing lens assembly includes, in order from an object side to an image side, a stop 401, a first lens element 410, a second lens element 420, an aperture stop 400, a third lens element 430, a fourth lens element 440, a stop 402, a fifth lens element 450, a sixth lens element 460, an IR-cut filter 470 and an image surface 480. The image sensor 490 is disposed on the image surface 480 of the optical photographing lens assembly. The optical photographing lens assembly includes six lens elements (410, 420, 430, 440, 450 and 460) without additional one or more lens elements inserted between the first lens element 410 and the sixth lens element 460.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point in an off-axis region thereof, the object-side surface 461 of the sixth lens element 460 includes at least one critical point in the off-axis region thereof.

The IR-cut filter 470 is made of a glass material and located between the sixth lens element 460 and the image surface 480, and will not affect the focal length of the optical photographing lens assembly.

The detailed optical data of the 4th embodiment are shown in TABLE 7 and the aspheric surface data are shown in TABLE 8 below.

TABLE 7

4th Embodiment
f = 7.48 mm, Fno = 2.25, HFOV = 16.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.820 | | | | |
| 2 | Lens 1 | 1.969 | ASP | 0.932 | Plastic | 1.545 | 56.1 | 4.58 |
| 3 | | 7.782 | ASP | 0.060 | | | | |
| 4 | Lens 2 | 3.634 | ASP | 0.220 | Plastic | 1.669 | 19.5 | −8.53 |
| 5 | | 2.167 | ASP | 0.479 | | | | |
| 6 | Ape. Stop | Plano | | −0.419 | | | | |
| 7 | Lens 3 | 2.116 | ASP | 0.644 | Plastic | 1.544 | 56.0 | 7.48 |
| 8 | | 3.933 | ASP | 0.785 | | | | |
| 9 | Lens 4 | −34.388 | ASP | 0.250 | Plastic | 1.614 | 26.0 | −4.21 |
| 10 | | 2.804 | ASP | 0.314 | | | | |
| 11 | Stop | Plano | | 1.098 | | | | |
| 12 | Lens 5 | −3.426 | ASP | 0.765 | Plastic | 1.669 | 19.5 | 4.41 |
| 13 | | −1.727 | ASP | 0.069 | | | | |
| 14 | Lens 6 | −1.585 | ASP | 0.280 | Plastic | 1.544 | 56.0 | −5.25 |
| 15 | | −3.786 | ASP | 0.300 | | | | |
| 16 | IR-cut filter | Plano | | 0.110 | Glass | 1.517 | 64.2 | — |
| 17 | | Plano | | 0.507 | | | | |
| 18 | Image | Plano | | — | | | | |

Reference wavelength is 587.6 nm (d-line).
The maximum effective radius of the surface 1 is 1.651 mm.
The maximum effective radius of the surface 11 is 1.080 mm.

TABLE 8

Aspheric Coefficients

| Surface # | 2 | 3 | 4 | 5 | 7 | 8 |
|---|---|---|---|---|---|---|
| k = | 1.2427E−01 | −4.6432E+01 | −6.4621E+01 | −2.3406E+01 | −1.1353E+01 | −2.8393E+00 |
| A4 = | −5.4647E−03 | 5.3441E−04 | 5.5397E−02 | 5.3732E−02 | −7.3393E−04 | −4.1264E−02 |
| A6 = | 3.4159E−03 | 5.3474E−02 | 7.0484E−02 | 2.6298E−01 | 4.1752E−01 | 4.1855E−02 |
| A8 = | −4.4590E−03 | −3.8548E−02 | −3.1165E−02 | −5.3884E−01 | −7.3824E−01 | −6.8437E−02 |
| A10 = | 2.3188E−03 | 1.2003E−02 | 2.1184E−02 | 4.6702E−01 | 6.2443E−01 | 5.7464E−02 |
| A12 = | −6.3209E−04 | −1.9942E−03 | −5.6625E−03 | −1.8676E−01 | −2.5638E−01 | −2.7962E−02 |
| A14 = | | 1.6418E−04 | 4.7338E−04 | 2.8101E−02 | 4.0739E−02 | 5.7185E−03 |

| Surface # | 9 | 10 | 12 | 13 | 14 | 15 |
|---|---|---|---|---|---|---|
| k = | 3.7835E+01 | −2.1030E+00 | −3.7098E−01 | −7.6908E−01 | −1.7790E+00 | 8.4077E−01 |
| A4 = | −2.2301E−01 | −1.0458E−01 | −2.3303E−04 | 3.6419E−02 | 1.2877E−02 | −3.1350E−02 |
| A6 = | 5.6495E−04 | 3.7938E−02 | −3.0097E−02 | −7.4815E−02 | −3.0177E−02 | 5.7078E−02 |
| A8 = | 2.6090E−01 | 3.2670E−01 | 3.4077E−02 | 5.4062E−02 | 6.8052E−03 | −5.4177E−02 |
| A10 = | −4.6654E−01 | −5.7338E−01 | −1.7257E−02 | −1.9628E−02 | 2.6539E−03 | 2.3888E−02 |
| A12 = | 3.5736E−01 | 4.6640E−01 | 4.6605E−03 | 3.8913E−03 | −1.2386E−03 | −5.4925E−03 |
| A14 = | −1.0633E−01 | −1.4819E−01 | −4.7602E−04 | −2.9399E−04 | 2.7134E−04 | 6.0075E−04 |
| A16 = | | | | | −2.8557E−05 | −1.9846E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

4th Embodiment

| | | | | |
|---|---|---|---|---|
| f (mm) | 7.48 | | Y41/Y51 | 0.47 |
| Fno | 2.25 | | Y41/Y52 | 0.44 |
| HFOV (deg.) | 16.8 | | Y41/Y61 | 0.42 |
| FOV | 33.60 | | Y41/Y62 | 0.40 |
| Nmax | 1.669 | | Y42/Y11 | 0.53 |
| V40 | 3 | | Y42/Y12 | 0.56 |
| V30 | 3 | | Y42/Y21 | 0.58 |
| V25 | 2 | | Y42/Y22 | 0.65 |
| Sag11/CT1 | 0.88 | | Y42/Y31 | 0.66 |
| ΣAT/(T34 + T45) | 1.09 | | Y42/Y32 | 0.71 |
| BL/(T34 + T45) | 0.42 | | Y42/Y51 | 0.53 |
| Td/BL | 5.97 | | Y42/Y52 | 0.49 |
| TL (mm) | 6.39 | | Y42/Y61 | 0.47 |
| TL/f | 0.85 | | Y42/Y62 | 0.45 |
| Y11/Y62 | 0.85 | | Sag11/R1 | 0.42 |
| Y41/Y11 | 0.47 | | f/R8 | 2.67 |
| Y41/Y12 | 0.51 | | f4/|f2| | −0.49 |
| Y41/Y21 | 0.53 | | f4/|f3| | −0.56 |

-continued

| 4th Embodiment | | | |
|---|---|---|---|
| Y41/Y22 | 0.58 | f4/\|f5\| | −0.96 |
| Y41/Y31 | 0.59 | f4/\|f6\| | −0.80 |
| Y41/Y32 | 0.64 | f/ImgH | 3.27 |

5th Embodiment

Figure 9:
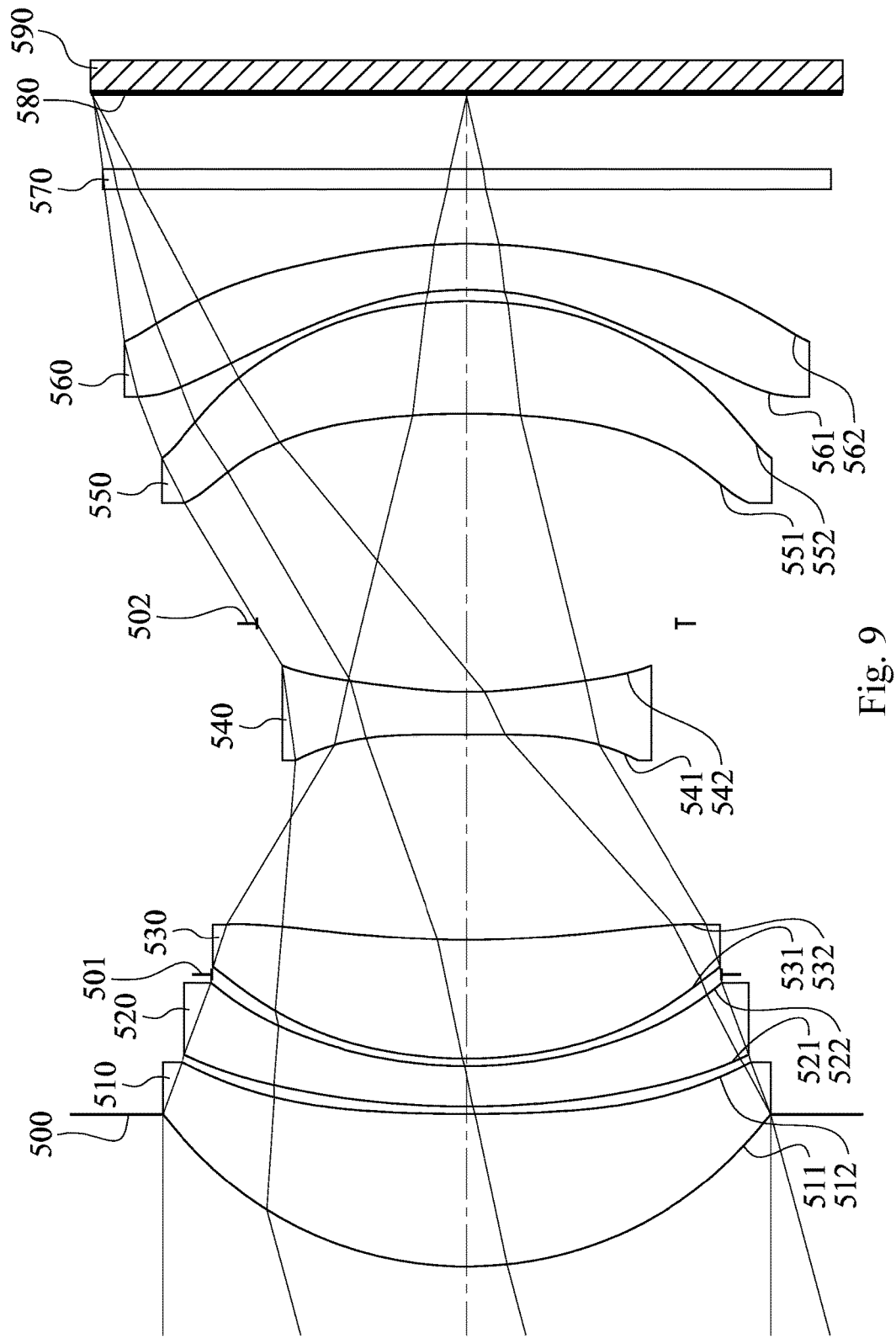
FIG. 9 is a schematic view of an imaging apparatus according to the 5th embodiment of the present disclosure.
Figure 10:
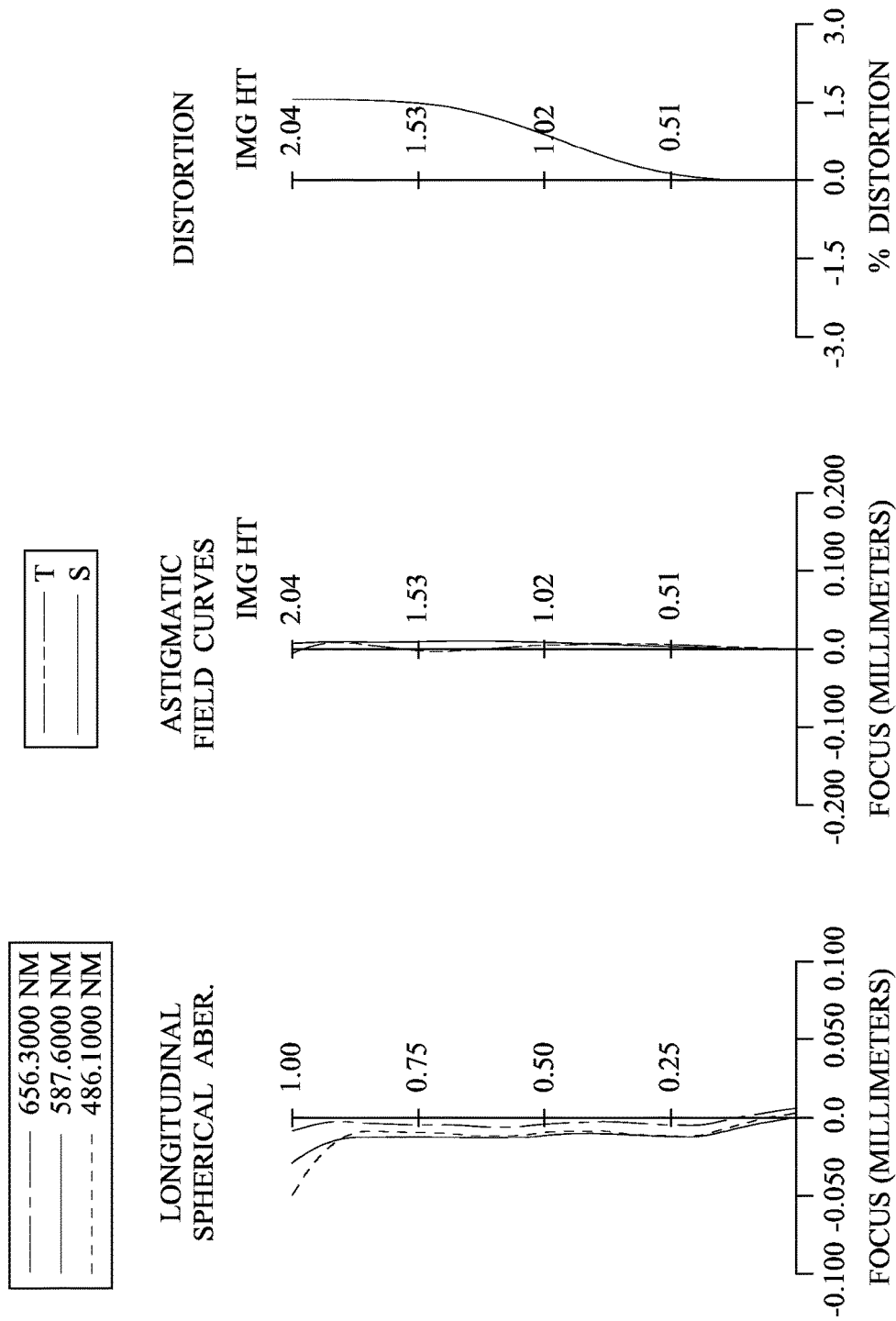
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an optical photographing lens assembly (its reference numeral is omitted) and an image sensor 590. The optical photographing lens assembly includes, in order from an object side to an image side, an aperture stop 500, a first lens element 510, a second lens element 520, a stop 501, a third lens element 530, a fourth lens element 540, a stop 502, a fifth lens element 550, a sixth lens element 560, an IR-cut filter 570 and an image surface 580. The image sensor 590 is disposed on the image surface 580 of the optical photographing lens assembly. The optical photographing lens assembly includes six lens elements (510, 520, 530, 540, 550 and 560) without additional one or more lens elements inserted between the first lens element 510 and the sixth lens element 560.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric. Furthermore, each of the object-side surface 561 and the image-side surface 562 of the sixth lens element 560 includes at least one inflection point in an off-axis region thereof.

The IR-cut filter 570 is made of a glass material and located between the sixth lens element 560 and the image surface 580, and will not affect the focal length of the optical photographing lens assembly.

The detailed optical data of the 5th embodiment are shown in TABLE 9 and the aspheric surface data are shown in TABLE 10 below.

TABLE 9

5th Embodiment
f = 7.50 mm, Fno = 2.27, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.828 | | | | |
| 2 | Lens 1 | 2.077 | ASP | 0.832 | Plastic | 1.545 | 56.1 | 4.54 |
| 3 | | 11.160 | ASP | 0.040 | | | | |
| 4 | Lens 2 | 5.051 | ASP | 0.220 | Plastic | 1.669 | 19.5 | −8.19 |
| 5 | | 2.582 | ASP | 0.498 | | | | |
| 6 | Stop | Plano | | −0.458 | | | | |
| 7 | Lens 3 | 2.498 | ASP | 0.645 | Plastic | 1.544 | 56.0 | 8.51 |
| 8 | | 4.931 | ASP | 1.117 | | | | |
| 9 | Lens 4 | 20.758 | ASP | 0.235 | Plastic | 1.566 | 37.4 | −4.68 |
| 10 | | 2.339 | ASP | 0.372 | | | | |
| 11 | Stop | Plano | | 1.142 | | | | |
| 12 | Lens 5 | −4.653 | ASP | 0.611 | Plastic | 1.669 | 19.5 | 6.86 |
| 13 | | −2.431 | ASP | 0.061 | | | | |
| 14 | Lens 6 | −1.945 | ASP | 0.250 | Plastic | 1.544 | 56.0 | −7.89 |
| 15 | | −3.717 | ASP | 0.300 | | | | |
| 16 | IR-cut filter | Plano | | 0.110 | Glass | 1.517 | 64.2 | — |
| 17 | | Plano | | 0.415 | | | | |
| 18 | Image | Plano | | — | | | | |

Reference wavelength is 587.6 nm (d-line).
The maximum effective radius of the surface 6 is 1.385 mm.
The maximum effective radius of the surface 11 is 1.140 mm.

TABLE 10

| Aspheric Coefficients | | | | | | |
|---|---|---|---|---|---|---|
| Surface # | 2 | 3 | 4 | 5 | 7 | 8 |
| k = | 2.4609E−01 | 2.5392E+01 | −9.5977E+01 | −2.6133E+01 | −1.2106E+01 | 2.2757E+00 |
| A4 = | −6.1361E−03 | 2.9123E−02 | 1.0517E−01 | 1.8151E−01 | 9.6018E−02 | −4.7545E−02 |
| A6 = | 3.8756E−03 | 3.2669E−02 | −1.0071E−01 | −1.3319E−01 | 8.1091E−02 | 5.3958E−02 |
| A8 = | −8.9404E−04 | −6.2505E−02 | 4.3200E−02 | −7.3565E−03 | −2.3501E−01 | −7.4840E−02 |
| A10 = | −1.3984E−03 | 4.6323E−02 | −2.4468E−04 | 8.2786E−02 | 2.2201E−01 | 5.7828E−02 |
| A12 = | 9.9494E−04 | −1.5439E−02 | −4.2025E−03 | −4.4320E−02 | −9.1930E−02 | −2.4306E−02 |
| A14 = | −2.2540E−04 | 1.9005E−03 | 7.6092E−04 | 7.1809E−03 | 1.3886E−02 | 4.0471E−03 |

| Surface # | 9 | 10 | 12 | 13 | 14 | 15 |
|---|---|---|---|---|---|---|
| k = | −9.9000E+01 | −1.1461E+01 | 3.6193E+00 | −1.0585E−01 | −9.6001E+00 | −5.4009E+00 |
| A4 = | −3.2477E−01 | −1.4206E−01 | −1.8668E−02 | −6.7722E−02 | −2.7691E−01 | −9.5880E−02 |
| A6 = | 1.8821E−01 | 1.1695E−01 | 2.9422E−02 | 2.9489E−02 | 3.9315E−01 | 2.0372E−01 |
| A8 = | −8.6589E−02 | 1.5763E−01 | −8.6356E−02 | 9.3888E−03 | −2.9595E−01 | −1.9761E−01 |
| A10 = | 3.1711E−02 | −4.2753E−01 | 1.4102E−01 | −1.5542E−02 | 1.2624E−01 | 1.0083E−01 |
| A12 = | −1.8108E−02 | 5.1219E−01 | −1.0344E−01 | 4.8536E−03 | −3.0431E−02 | −2.8986E−02 |
| A14 = | 4.2662E−03 | −3.1283E−01 | 3.5120E−02 | −7.4142E−04 | 3.9266E−03 | 4.4410E−03 |
| A16 = | 3.9648E−03 | 8.0612E−02 | −4.3840E−03 | 1.1393E−04 | −2.1320E−04 | −2.8008E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 7.50 | Y41/Y51 | 0.61 |
| Fno | 2.27 | Y41/Y52 | 0.56 |
| HFOV (deg.) | 15.0 | Y41/Y61 | 0.52 |
| FOV | 30.00 | Y41/Y62 | 0.50 |
| Nmax | 1.669 | Y42/Y11 | 0.61 |
| V40 | 3 | Y42/Y12 | 0.65 |
| V30 | 2 | Y42/Y21 | 0.65 |
| V25 | 2 | Y42/Y22 | 0.72 |
| Sag11/CT1 | 1.00 | Y42/Y31 | 0.73 |
| ΣAT/(T34 + T45) | 1.05 | Y42/Y32 | 0.77 |
| BL/(T34 + T45) | 0.31 | Y42/Y51 | 0.65 |
| Td/BL | 6.75 | Y42/Y52 | 0.61 |
| TL (mm) | 6.39 | Y42/Y61 | 0.56 |
| TL/f | 0.85 | Y42/Y62 | 0.54 |
| Y11/Y62 | 0.89 | Sag11/R1 | 0.40 |
| Y41/Y11 | 0.56 | f/R8 | 3.21 |
| Y41/Y12 | 0.60 | f4/|f2| | −0.57 |
| Y41/Y21 | 0.61 | f4/|f3| | −0.55 |
| Y41/Y22 | 0.67 | f4/|f5| | −0.68 |
| Y41/Y31 | 0.68 | f4/|f6| | −0.59 |
| Y41/Y32 | 0.71 | f/ImgH | 3.68 |

6th Embodiment

Figure 11:
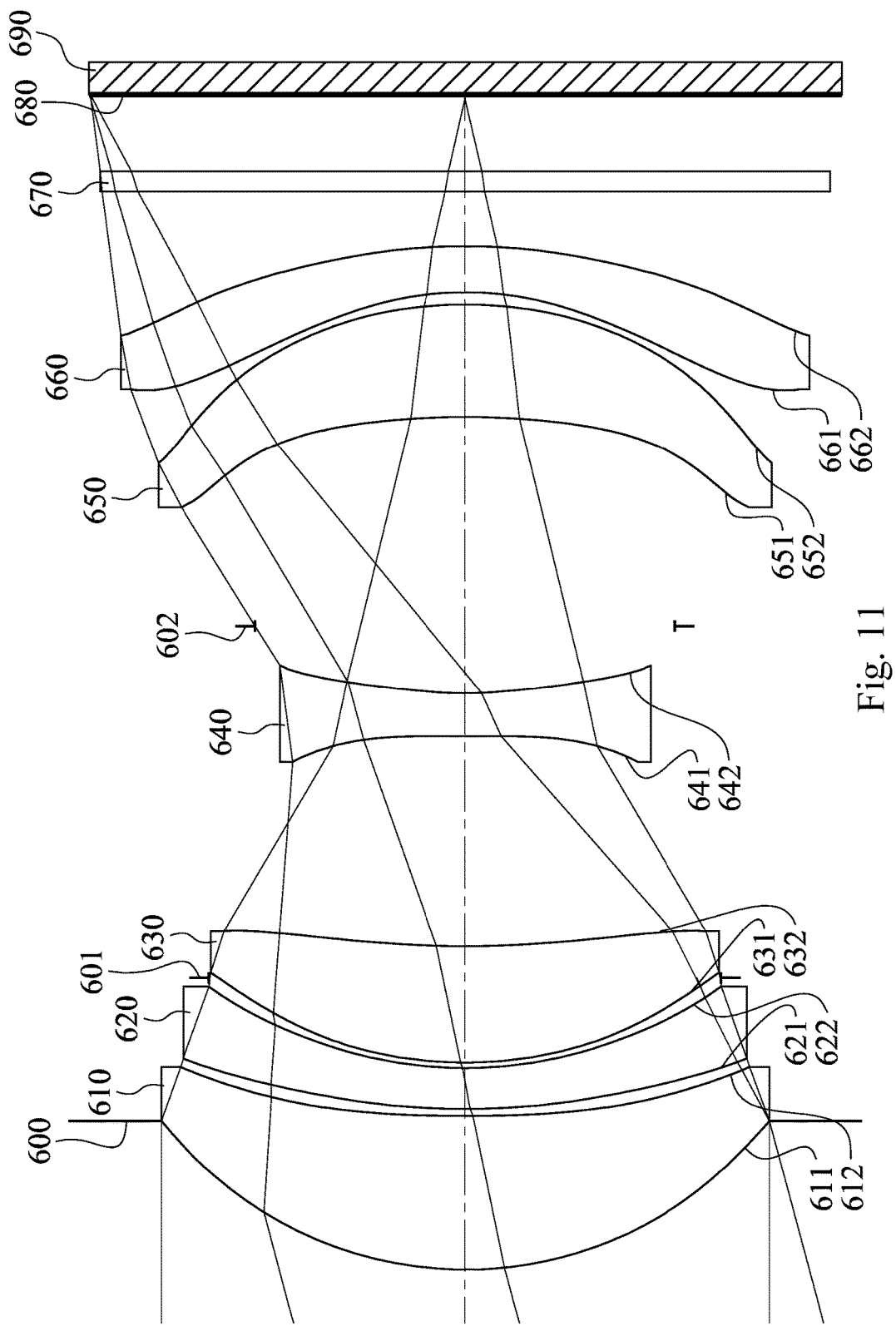
FIG. 11 is a schematic view of an imaging apparatus according to the 6th embodiment of the present disclosure.
Figure 12:
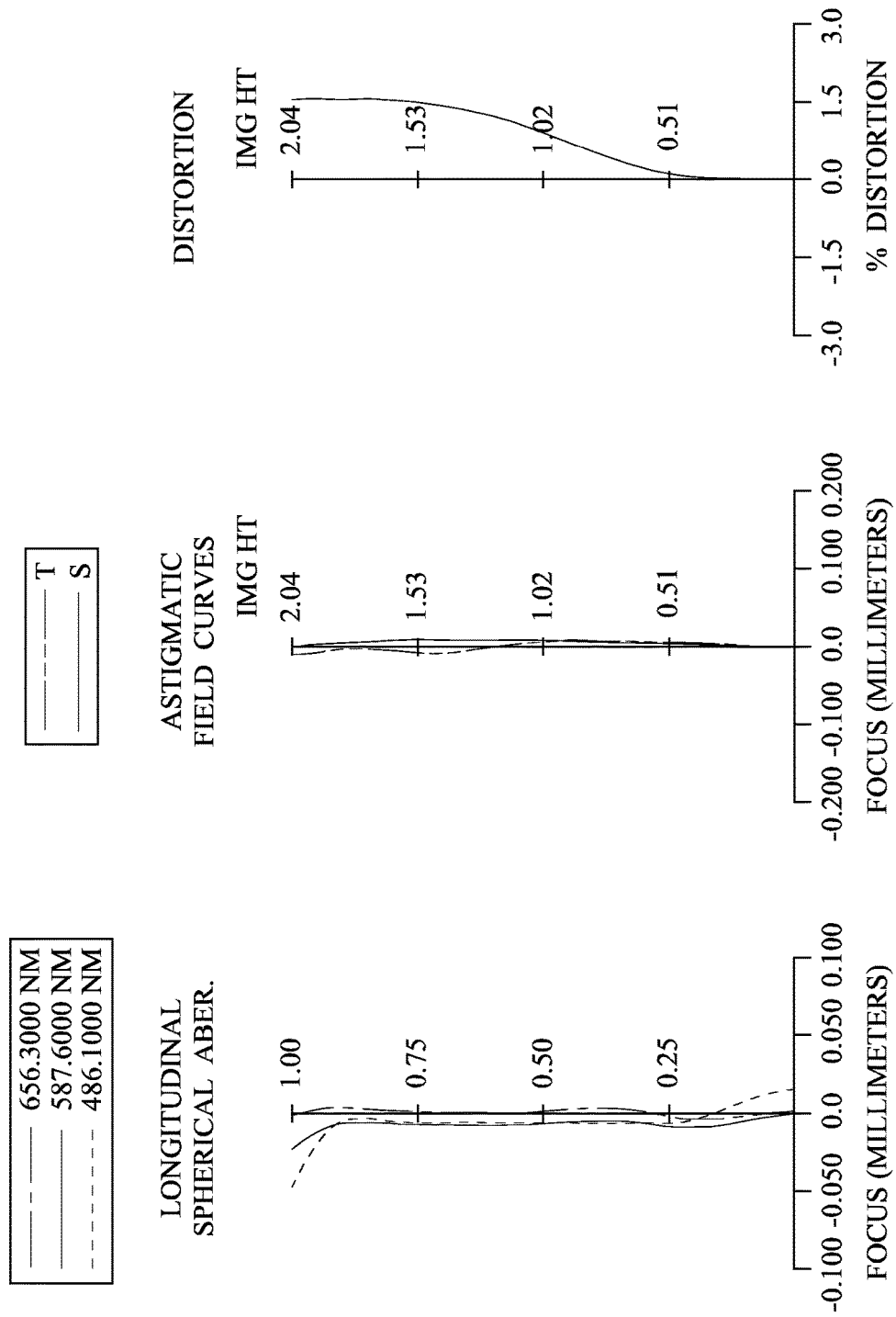
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an optical photographing lens assembly (its reference numeral is omitted) and an image sensor 690. The optical photographing lens assembly includes, in order from an object side to an image side, an aperture stop 600, a first lens element 610, a second lens element 620, a stop 601, a third lens element 630, a fourth lens element 640, a stop 602, a fifth lens element 650, a sixth lens element 660, an IR-cut filter 670 and an image surface 680. The image sensor 690 is disposed on the image surface 680 of the optical photographing lens assembly. The optical photographing lens assembly includes six lens elements (610, 620, 630, 640, 650 and 660) without additional one or more lens elements inserted between the first lens element 610 and the sixth lens element 660.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being concave in a paraxial region thereof and an image-side surface 662 being convex in a paraxial region thereof. The sixth lens element 660 is made of a plastic material, and has the object-side surface 661 and the image-side surface 662 being both aspheric. Furthermore, each of the object-side surface 661 and the image-side surface 662 of the sixth lens element 660 includes at least one inflection point in an off-axis region thereof, the object-side surface 661 of the sixth lens element 660 includes at least one critical point in the off-axis region thereof.

The IR-cut filter 670 is made of a glass material and located between the sixth lens element 660 and the image surface 680, and will not affect the focal length of the optical photographing lens assembly.

The detailed optical data of the 6th embodiment are shown in TABLE 11 and the aspheric surface data are shown in TABLE 12 below.

TABLE 11

6th Embodiment
f = 7.50 mm, Fno = 2.27, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.809 | | | | |
| 2 | Lens 1 | 2.086 | ASP | 0.837 | Plastic | 1.545 | 56.1 | 4.62 |
| 3 | | 10.431 | ASP | 0.040 | | | | |
| 4 | Lens 2 | 4.771 | ASP | 0.220 | Plastic | 1.669 | 19.5 | −7.32 |
| 5 | | 2.372 | ASP | 0.490 | | | | |
| 6 | Stop | Plano | | −0.460 | | | | |
| 7 | Lens 3 | 2.331 | ASP | 0.632 | Plastic | 1.544 | 56.0 | 7.14 |
| 8 | | 5.269 | ASP | 1.142 | | | | |
| 9 | Lens 4 | 40.883 | ASP | 0.235 | Plastic | 1.566 | 37.4 | −4.60 |
| 10 | | 2.444 | ASP | 0.366 | | | | |
| 11 | Stop | Plano | | 1.136 | | | | |
| 12 | Lens 5 | −4.787 | ASP | 0.611 | Plastic | 1.669 | 19.5 | 6.83 |
| 13 | | −2.458 | ASP | 0.066 | | | | |
| 14 | Lens 6 | −1.928 | ASP | 0.250 | Plastic | 1.544 | 56.0 | −7.84 |
| 15 | | −3.680 | ASP | 0.300 | | | | |
| 16 | IR-cut filter | Plano | | 0.110 | Glass | 1.517 | 64.2 | — |
| 17 | | Plano | | 0.416 | | | | |
| 18 | Image | Plano | | — | | | | |

Reference wavelength is 587.6 nm (d-line).
The maximum effective radius of the surface 6 is 1.390 mm.
The maximum effective radius of the surface 11 is 1.140 mm.

TABLE 12

Aspheric Coefficients

| Surface # | 2 | 3 | 4 | 5 | 7 | 8 |
|---|---|---|---|---|---|---|
| k = | 2.3308E−01 | 1.6059E+01 | −9.8925E+01 | −2.4814E+01 | −1.2821E+01 | 3.8538E+00 |
| A4 = | −3.9067E−03 | 7.6803E−02 | 1.4844E−01 | 1.8844E−01 | 1.0616E−01 | −3.9212E−02 |
| A6 = | 2.5914E−03 | −3.7445E−02 | −1.5126E−01 | −8.0331E−02 | 1.2610E−01 | 3.8032E−02 |
| A8 = | −2.1298E−03 | −2.2869E−02 | 5.8588E−02 | −1.3096E−01 | −3.4932E−01 | −5.4617E−02 |
| A10 = | 1.4052E−04 | 3.7612E−02 | 6.2538E−03 | 1.8577E−01 | 3.1873E−01 | 4.2517E−02 |
| A12 = | 3.0102E−04 | −1.6100E−02 | −9.6311E−03 | −8.4679E−02 | −1.3031E−01 | −1.8562E−02 |
| A14 = | −1.1334E−04 | 2.2996E−03 | 1.7432E−03 | 1.3368E−02 | 1.9906E−02 | 3.2490E−03 |

| Surface # | 9 | 10 | 12 | 13 | 14 | 15 |
|---|---|---|---|---|---|---|
| k = | 3.7293E+01 | −1.0061E+01 | 4.2771E+00 | −1.2761E−01 | −7.7797E+00 | −5.1371E+00 |
| A4 = | −2.9931E−01 | −1.3797E−01 | −1.8710E−02 | −6.1984E−02 | −2.4084E−01 | −9.5946E−02 |
| A6 = | 2.0859E−01 | 1.6541E−01 | 2.1137E−02 | 4.1996E−02 | 3.4993E−01 | 2.0356E−01 |
| A8 = | −2.4859E−01 | −5.6400E−02 | −1.1629E−01 | −2.4981E−02 | −2.8396E−01 | −2.0411E−01 |
| A10 = | 3.9958E−01 | 2.3208E−02 | 1.7306E−01 | 1.7077E−02 | 1.3587E−01 | 1.0905E−01 |
| A12 = | −4.6142E−01 | −1.3325E−02 | −1.2696E−01 | −1.1110E−02 | −3.7238E−02 | −3.2742E−02 |
| A14 = | 2.8403E−01 | 7.7415E−03 | 4.3907E−02 | 3.2479E−03 | 5.4744E−03 | 5.2303E−03 |
| A16 = | −6.8897E−02 | 9.1147E−04 | −5.6115E−03 | −2.8914E−04 | −3.3744E−04 | −3.4437E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 7.50 | Y41/Y51 | 0.61 |
| Fno | 2.27 | Y41/Y52 | 0.56 |
| HFOV (deg.) | 15.0 | Y41/Y61 | 0.52 |
| FOV | 30.00 | Y41/Y62 | 0.50 |
| Nmax | 1.669 | Y42/Y11 | 0.61 |
| V40 | 3 | Y42/Y12 | 0.65 |
| V30 | 2 | Y42/Y21 | 0.66 |
| V25 | 2 | Y42/Y22 | 0.72 |
| Sag11/CT1 | 0.97 | Y42/Y31 | 0.73 |
| ΣAT/(T34 + T45) | 1.05 | Y42/Y32 | 0.77 |
| BL/(T34 + T45) | 0.31 | Y42/Y51 | 0.65 |
| Td/BL | 6.73 | Y42/Y52 | 0.60 |
| TL (mm) | 6.39 | Y42/Y61 | 0.55 |
| TL/f | 0.85 | Y42/Y62 | 0.54 |
| Y11/Y62 | 0.88 | Sag11/R1 | 0.39 |
| Y41/Y11 | 0.57 | f/R8 | 3.07 |
| Y41/Y12 | 0.61 | f4/|f2| | −0.63 |
| Y41/Y21 | 0.61 | f4/|f3| | −0.64 |
| Y41/Y22 | 0.67 | f4/|f5| | −0.67 |
| Y41/Y31 | 0.68 | f4/|f6| | −0.59 |
| Y41/Y32 | 0.71 | f/ImgH | 3.68 |

7th Embodiment

Figure 13:
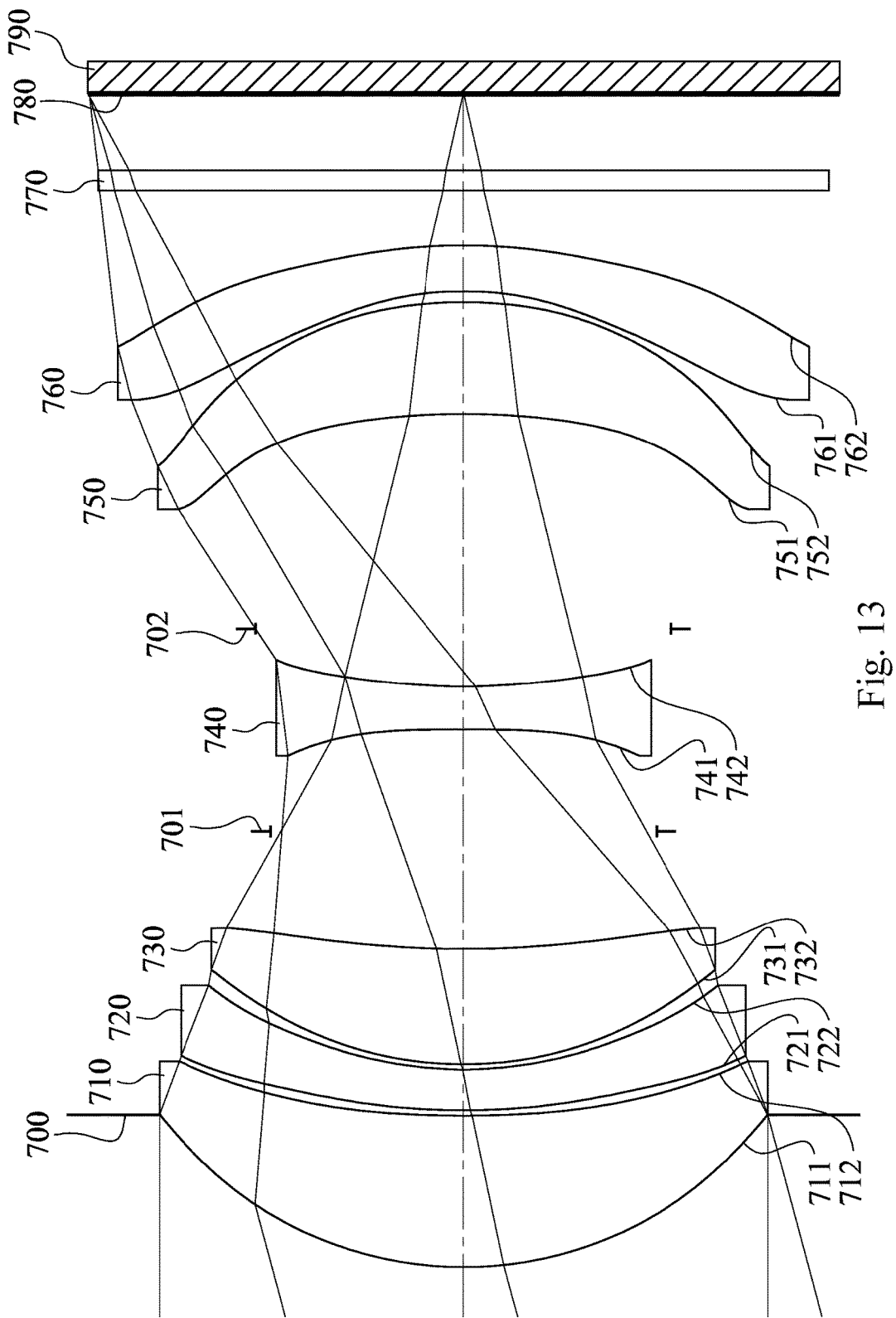
FIG. 13 is a schematic view of an imaging apparatus according to the 7th embodiment of the present disclosure.
Figure 14:
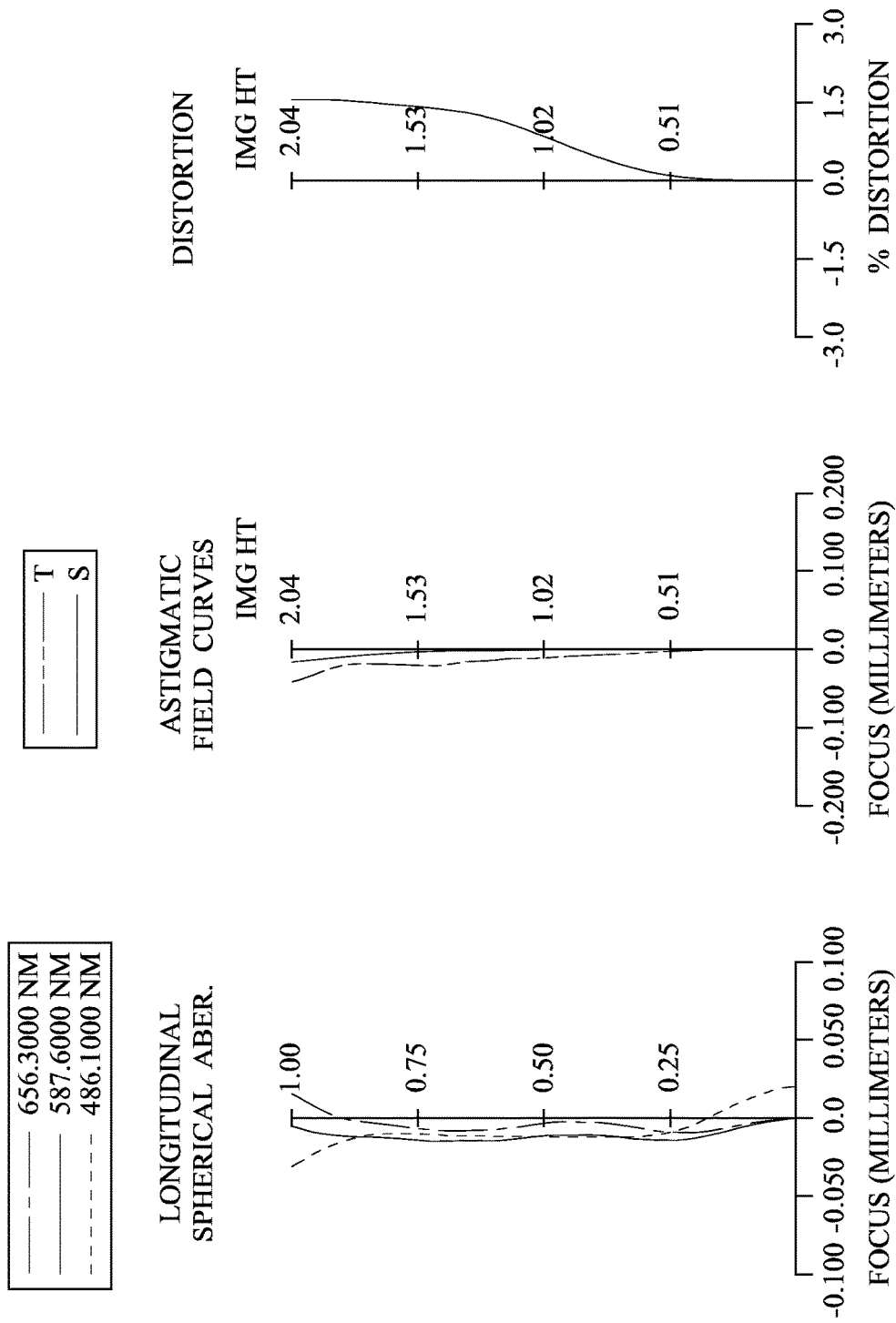
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an optical photographing lens assembly (its reference numeral is omitted) and an image sensor 790. The optical photographing lens assembly includes, in order from an object side to an image side, an aperture stop 700, a first lens element 710, a second lens element 720, a third lens element 730, a stop 701, a fourth lens element 740, a stop 702, a fifth lens element 750, a sixth lens element 760, an IR-cut filter 770 and an image surface 780. The image sensor 790 is disposed on the image surface 780 of the optical photographing lens assembly. The optical photographing lens assembly includes six lens elements (710, 720, 730, 740, 750 and 760) without additional one or more lens elements inserted between the first lens element 710 and the sixth lens element 760.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric. Furthermore, each of the object-side surface 761 and the image-side surface 762 of the sixth lens element 760 includes at least one inflection point in an off-axis region thereof.

The IR-cut filter 770 is made of a glass material and located between the sixth lens element 760 and the image surface 780, and will not affect the focal length of the optical photographing lens assembly.

The detailed optical data of the 7th embodiment are shown in TABLE 13 and the aspheric surface data are shown in TABLE 14 below.

TABLE 13

7th Embodiment
f = 7.51 mm, Fno = 2.27, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.831 | | | | |
| 2 | Lens 1 | 2.078 | ASP | 0.827 | Plastic | 1.545 | 56.1 | 4.73 |
| 3 | | 9.214 | ASP | 0.030 | | | | |
| 4 | Lens 2 | 4.631 | ASP | 0.220 | Plastic | 1.669 | 19.5 | −7.15 |
| 5 | | 2.308 | ASP | 0.030 | | | | |
| 6 | Lens 3 | 2.275 | ASP | 0.626 | Plastic | 1.544 | 56.0 | 6.74 |
| 7 | | 5.415 | ASP | 0.642 | | | | |
| 8 | Stop | Plano | | 0.553 | | | | |
| 9 | Lens 4 | −18.614 | ASP | 0.235 | Plastic | 1.566 | 37.4 | −4.82 |
| 10 | | 3.209 | ASP | 0.315 | | | | |

TABLE 13-continued

7th Embodiment
f = 7.51 mm, Fno = 2.27, HFOV = 15.0 deg.

| Surface # | | Curvature Radius | | Thickness | Material | Index | Abbe # | Focal Length |
|---|---|---|---|---|---|---|---|---|
| 11 | Stop | Plano | | 1.169 | | | | |
| 12 | Lens 5 | −4.587 | ASP | 0.608 | Plastic | 1.669 | 19.5 | 8.65 |
| 13 | | −2.694 | ASP | 0.060 | | | | |
| 14 | Lens 6 | −1.988 | ASP | 0.250 | Plastic | 1.544 | 56.0 | −9.66 |
| 15 | | −3.339 | ASP | 0.300 | | | | |
| 16 | IR-cut filter | Plano | | 0.110 | Glass | 1.517 | 64.2 | — |
| 17 | | Plano | | 0.417 | | | | |
| 18 | Image | Plano | | — | | | | |

Reference wavelength is 587.6 nm (d-line).
The maximum effective radius of the surface 8 is 1.050 mm.
The maximum effective radius of the surface 11 is 1.130 mm.

TABLE 14

Aspheric Coefficients

| Surface # | 2 | 3 | 4 | 5 | 6 | 7 |
|---|---|---|---|---|---|---|
| k = | 2.3154E−01 | 1.9738E+01 | −9.0525E+01 | −2.1971E+01 | −1.1696E+01 | 8.8606E+00 |
| A4 = | −4.7027E−04 | 1.2542E−01 | 1.8930E−01 | 2.3798E−01 | 1.7631E−01 | −2.4499E−02 |
| A6 = | −3.2095E−03 | −1.3496E−01 | −2.4344E−01 | −2.5677E−01 | −8.7204E−02 | 1.6969E−02 |
| A8 = | 5.0884E−03 | 7.2667E−02 | 1.5903E−01 | 1.4866E−01 | −2.0889E−02 | −1.9910E−02 |
| A10 = | −4.6408E−03 | −1.7994E−02 | −5.6910E−02 | −4.8661E−02 | 4.6529E−02 | 9.1070E−03 |
| A12 = | 1.9539E−03 | 1.6466E−03 | 1.1600E−02 | 1.3770E−02 | −1.6498E−02 | −2.3565E−03 |
| A14 = | −3.3716E−04 | −2.6419E−05 | −1.1004E−03 | −2.6408E−03 | 1.3107E−03 | 1.4700E−04 |

| Surface # | 9 | 10 | 12 | 13 | 14 | 15 |
|---|---|---|---|---|---|---|
| k = | −9.9000E+01 | −6.1063E+00 | 6.1214E+00 | 4.8946E−01 | −7.9265E+00 | −4.8719E+00 |
| A4 = | −2.0143E−01 | −1.0284E−01 | −3.2602E−02 | −1.5797E−01 | −3.3635E−01 | −9.1822E−02 |
| A6 = | 5.7663E−02 | 7.6856E−02 | 5.6835E−02 | 2.0919E−01 | 5.7256E−01 | 2.3392E−01 |
| A8 = | 1.9367E−01 | 2.4726E−01 | −2.0131E−01 | −1.9631E−01 | −5.0576E−01 | −2.3871E−01 |
| A10 = | −6.6482E−01 | −7.5289E−01 | 2.8173E−01 | 1.2364E−01 | 2.4963E−01 | 1.2288E−01 |
| A12 = | 1.0245E+00 | 1.0772E+00 | −1.9403E−01 | −4.9345E−02 | −6.9244E−02 | −3.4896E−02 |
| A14 = | −8.0489E−01 | −7.7525E−01 | 6.3544E−02 | 1.0343E−02 | 1.0190E−02 | 5.2394E−03 |
| A16 = | 2.5546E−01 | 2.2570E−01 | −7.7874E−03 | −7.9676E−04 | −6.2279E−04 | −3.2452E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 7.51 | Y41/Y51 | 0.62 |
| Fno | 2.27 | Y41/Y52 | 0.57 |
| HFOV (deg.) | 15.0 | Y41/Y61 | 0.53 |
| FOV | 30.00 | Y41/Y62 | 0.51 |
| Nmax | 1.669 | Y42/Y11 | 0.62 |
| V40 | 3 | Y42/Y12 | 0.66 |
| V30 | 2 | Y42/Y21 | 0.66 |
| V25 | 2 | Y42/Y22 | 0.74 |
| Sag11/CT1 | 1.01 | Y42/Y31 | 0.74 |
| ΣAT/(T34 + T45) | 1.04 | Y42/Y32 | 0.79 |
| BL/(T34 + T45) | 0.31 | Y42/Y51 | 0.66 |
| Td/BL | 6.73 | Y42/Y52 | 0.61 |
| TL (mm) | 6.39 | Y42/Y61 | 0.56 |
| TL/f | 0.85 | Y42/Y62 | 0.54 |
| Y11/Y62 | 0.88 | Sag11/R1 | 0.40 |
| Y41/Y11 | 0.58 | f/R8 | 2.34 |
| Y41/Y12 | 0.62 | f4/|f2| | −0.67 |
| Y41/Y21 | 0.62 | f4/|f3| | −0.71 |
| Y41/Y22 | 0.69 | f4/|f5| | −0.56 |
| Y41/Y31 | 0.70 | f4/|f6| | −0.50 |
| Y41/Y32 | 0.74 | f/ImgH | 3.68 |

8th Embodiment

Figure 15:
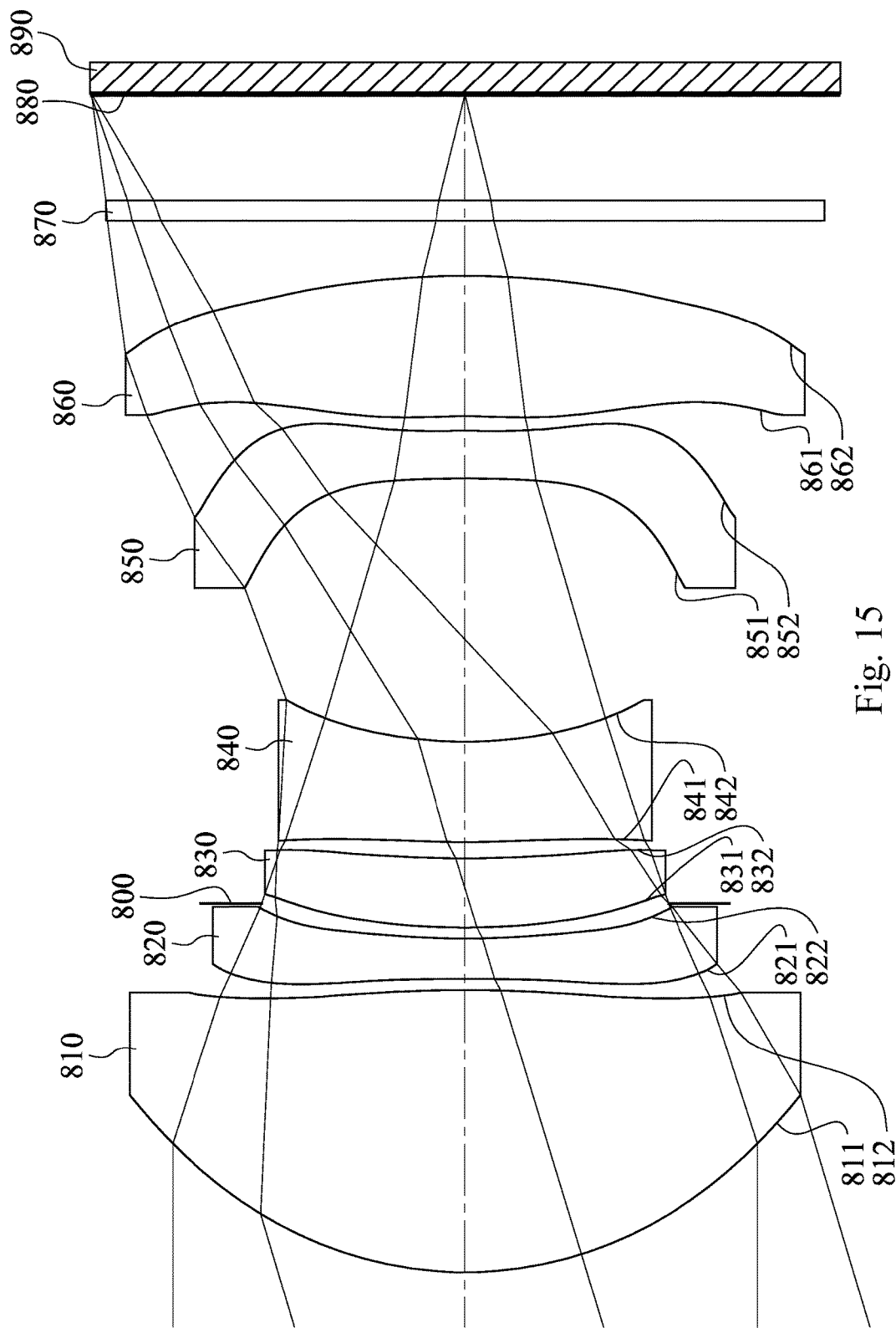
FIG. 15 is a schematic view of an imaging apparatus according to the 8th embodiment of the present disclosure.
Figure 16:
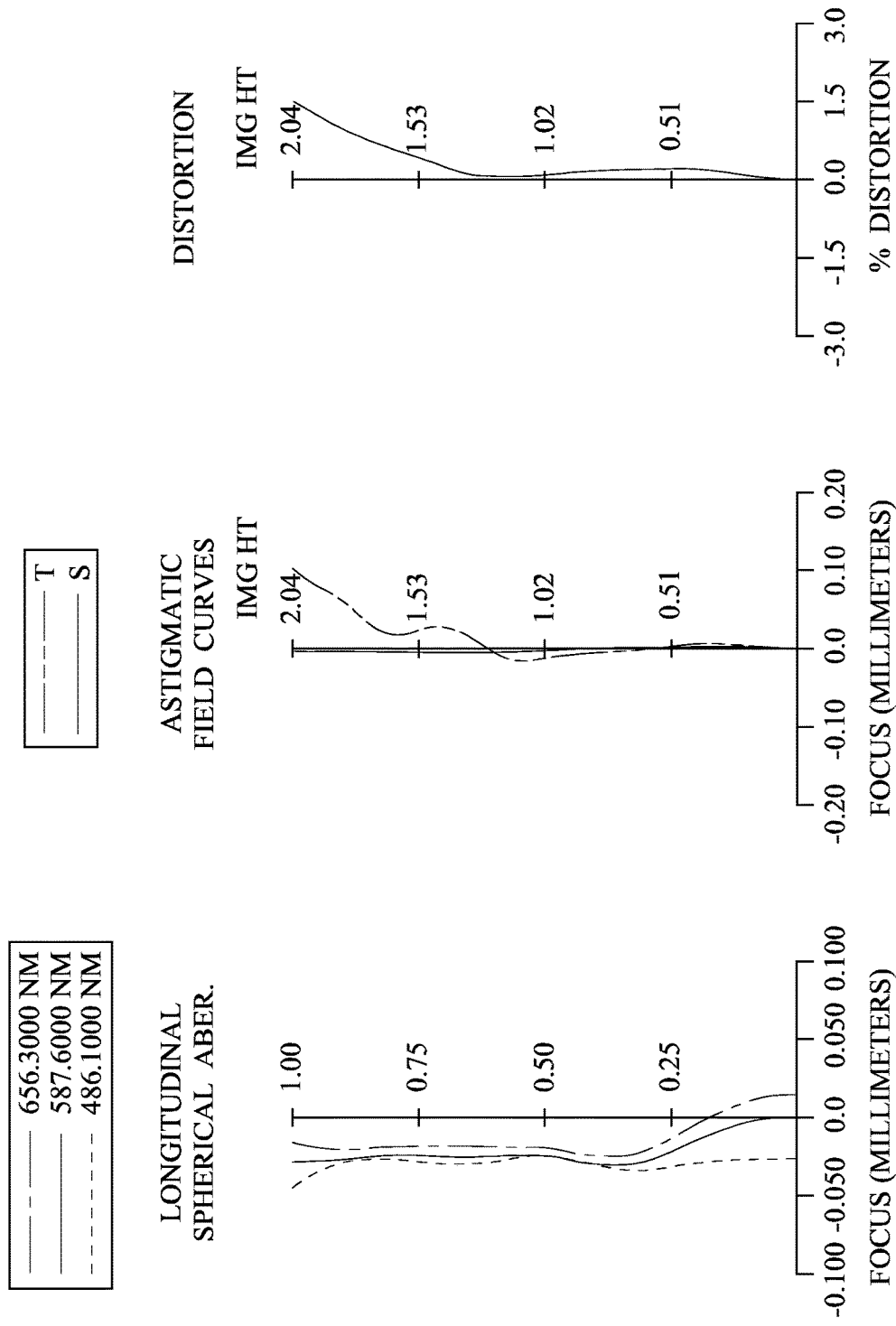
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an optical photographing lens assembly (its reference numeral is omitted) and an image sensor 890. The optical photographing lens assembly includes, in order from an object side to an image side, a first lens element 810, a second lens element 820, an aperture stop 800, a third lens element 830, a fourth lens element 840, a fifth lens element 850, a sixth lens element 860, an IR-cut filter 870 and an image surface 880. The image sensor 890 is disposed on the image surface 880 of the optical photographing lens assembly. The optical photographing lens assembly includes six lens elements (810, 820, 830, 840, 850 and 860) without additional one or more lens elements inserted between the first lens element 810 and the sixth lens element 860.

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with negative refractive power has an object-side surface 861 being concave in a paraxial region thereof and an image-side surface 862 being convex in a paraxial region thereof. The sixth lens element 860 is made of a plastic material, and has the object-side surface 861 and the image-side surface 862 being both aspheric. Furthermore, each of the object-side surface 861 and the image-side surface 862 of the sixth lens element 860 includes at least one inflection point in an off-axis region thereof, the object-side surface 861 of the sixth lens element 860 includes at least one critical point in the off-axis region thereof.

The IR-cut filter 870 is made of a glass material and located between the sixth lens element 860 and the image surface 880, and will not affect the focal length of the optical photographing lens assembly.

The detailed optical data of the 8th embodiment are shown in TABLE 15 and the aspheric surface data are shown in TABLE 16 below.

TABLE 15

8th Embodiment
f = 6.75 mm, Fno = 2.12, HFOV = 16.6 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 2.083 | ASP | 1.538 | Plastic | 1.544 | 55.9 | 3.33 |
| 2 |  | −10.165 | ASP | 0.060 |  |  |  |  |
| 3 | Lens 2 | −57.640 | ASP | 0.220 | Plastic | 1.584 | 28.2 | −8.67 |
| 4 |  | 5.564 | ASP | 0.192 |  |  |  |  |
| 5 | Ape. Stop | Plano |  | −0.132 |  |  |  |  |
| 6 | Lens 3 | 5.676 | ASP | 0.377 | Plastic | 1.544 | 55.9 | 106.15 |
| 7 |  | 6.148 | ASP | 0.089 |  |  |  |  |
| 8 | Lens 4 | 5.896 | ASP | 0.547 | Plastic | 1.614 | 26.0 | −6.51 |
| 9 |  | 2.297 | ASP | 1.434 |  |  |  |  |
| 10 | Lens 5 | −9.168 | ASP | 0.260 | Plastic | 1.584 | 28.2 | −45.12 |
| 11 |  | −14.204 | ASP | 0.079 |  |  |  |  |
| 12 | Lens 6 | −4.558 | ASP | 0.766 | Plastic | 1.660 | 20.4 | −224.18 |
| 13 |  | −5.017 | ASP | 0.300 |  |  |  |  |
| 14 | IR-cut filter | Plano |  | 0.110 | Glass | 1.517 | 64.2 | — |
| 15 |  | Plano |  | 0.580 |  |  |  |  |
| 16 | Image | Plano |  | — |  |  |  |  |

Reference wavelength is 587.6 nm (d-line).
The maximum effective radius of the surface 10 is 1.200 mm.

TABLE 16

Aspheric Coefficients

| Surface # | 1 | 2 | 3 | 4 | 6 | 7 |
|---|---|---|---|---|---|---|
| k = | −1.1271E−01 | 7.3522E+00 | 2.7567E+01 | 3.9566E+00 | 1.3580E+01 | −9.9000E+01 |
| A4 = | 9.6864E−06 | −8.7774E−02 | −1.7982E−01 | 1.6228E−01 | 3.5941E−01 | −1.2565E−02 |
| A6 = | −2.2210E−03 | 1.8822E−01 | 2.7907E−01 | −7.9230E−01 | −1.1298E+00 | 4.0995E−02 |
| A8 = | 1.7494E−03 | −1.3275E−01 | −1.4248E−01 | 1.3022E+00 | 1.6457E+00 | 4.4515E−02 |
| A10 = | −6.7044E−04 | 4.2923E−02 | 2.5651E−02 | −8.6463E−01 | −1.0796E+00 | −1.6856E−01 |
| A12 = | 6.0636E−05 | −5.1683E−03 | 1.2729E−03 | 2.1053E−01 | 2.5657E−01 | 8.3367E−02 |

TABLE 16-continued

Aspheric Coefficients

| Surface # | 8 | 9 | 10 | 11 | 12 | 13 |
|---|---|---|---|---|---|---|
| k = | 2.3819E+01 | 2.9876E+00 | −9.9000E+01 | 0.0000E+00 | −3.8222E+01 | −2.0282E+00 |
| A4 = | −2.2007E−01 | −1.0139E−01 | −4.3649E−02 | 6.7345E−01 | 5.4798E−01 | 6.5914E−03 |
| A6 = | 3.3569E−01 | 2.2255E−01 | −5.0800E−01 | −1.4871E+00 | −8.3424E−01 | −6.6964E−02 |
| A8 = | −3.5016E−01 | −4.9944E−01 | 7.4229E−01 | 1.5684E+00 | 6.6916E−01 | 8.8512E−02 |
| A10 = | 1.1839E−01 | 6.7584E−01 | −8.9621E−01 | −1.0782E+00 | −3.1804E−01 | −4.8635E−02 |
| A12 = | 2.6675E−02 | −4.7274E−01 | 9.3651E−01 | 4.8181E−01 | 8.7687E−02 | 1.3263E−02 |
| A14 = | −1.3185E−02 | 1.3159E−01 | −6.3280E−01 | −1.3021E−01 | −1.2897E−02 | −1.8506E−03 |
| A16 = | | | 1.7309E−01 | 1.6122E−02 | 7.8475E−04 | 1.0974E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 6.75 | Y41/Y51 | 0.85 |
| Fno | 2.12 | Y41/Y52 | 0.69 |
| HFOV (deg.) | 16.6 | Y41/Y61 | 0.59 |
| FOV | 33.20 | Y41/Y62 | 0.55 |
| Nmax | 1.660 | Y42/Y11 | 0.53 |
| V40 | 4 | Y42/Y12 | 0.65 |
| V30 | 4 | Y42/Y21 | 0.71 |
| V25 | 1 | Y42/Y22 | 0.86 |
| Sag11/CT1 | 0.63 | Y42/Y31 | 0.89 |
| ΣAT/(T34 + T45) | 1.13 | Y42/Y32 | 0.95 |
| BL/(T34 + T45) | 0.65 | Y42/Y51 | 0.81 |
| Td/BL | 5.48 | Y42/Y52 | 0.66 |
| TL (mm) | 6.42 | Y42/Y61 | 0.56 |
| TL/f | 0.95 | Y42/Y62 | 0.53 |
| Y11/Y62 | 0.99 | Sag11/R1 | 0.46 |
| Y41/Y11 | 0.56 | f/R8 | 2.94 |
| Y41/Y12 | 0.68 | f4/|f2| | −0.75 |
| Y41/Y21 | 0.74 | f4/|f3| | −0.06 |
| Y41/Y22 | 0.90 | f4/|f5| | −0.14 |
| Y41/Y31 | 0.93 | f4/|f6| | −0.03 |
| Y41/Y32 | 0.99 | f/ImgH | 3.31 |

9th Embodiment

Figure 17:
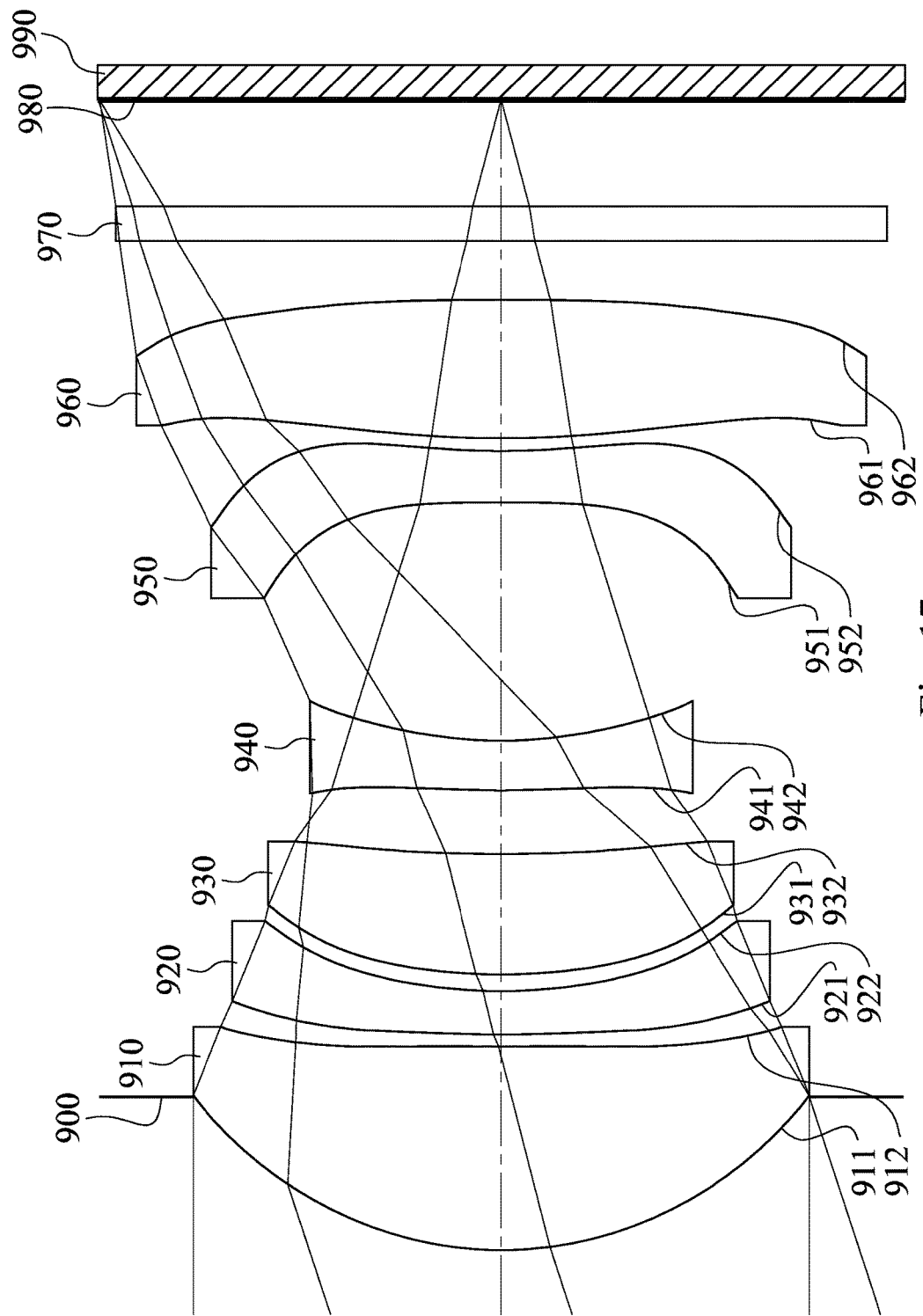
FIG. 17 is a schematic view of an imaging apparatus according to the 9th embodiment of the present disclosure.
Figure 18:
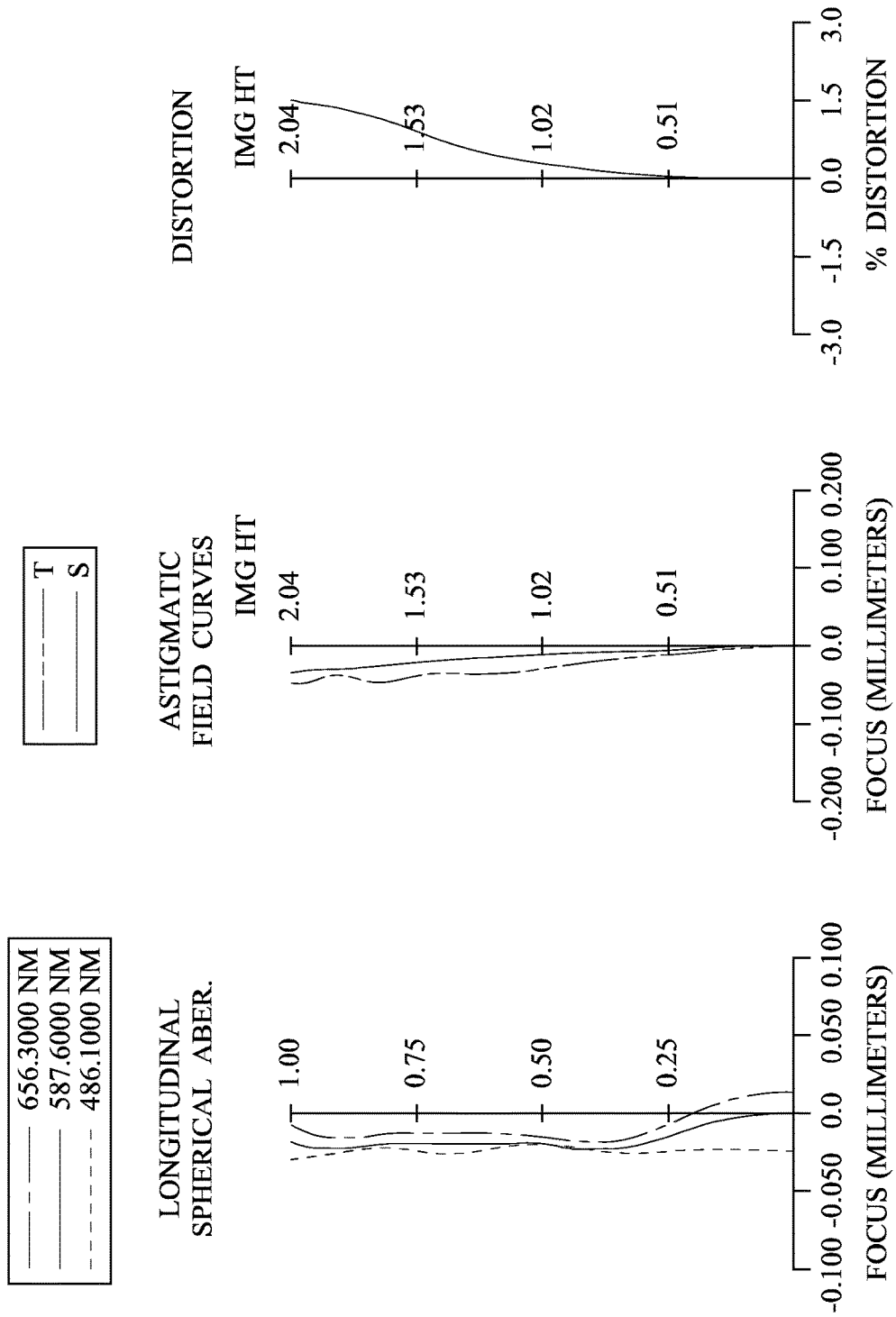
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an optical photographing lens assembly (its reference numeral is omitted) and an image sensor 990. The optical photographing lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 970 and an image surface 980. The image sensor 990 is disposed on the image surface 980 of the optical photographing lens assembly. The optical photographing lens assembly includes six lens elements (910, 920, 930, 940, 950 and 960) without additional one or more lens elements inserted between the first lens element 910 and the sixth lens element 960.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric.

The fifth lens element 950 with negative refractive power has an object-side surface 951 being concave in a paraxial region thereof and an image-side surface 952 being concave in a paraxial region thereof. The fifth lens element 950 is made of a plastic material, and has the object-side surface 951 and the image-side surface 952 being both aspheric.

The sixth lens element 960 with positive refractive power has an object-side surface 961 being convex in a paraxial region thereof and an image-side surface 962 being convex in a paraxial region thereof. The sixth lens element 960 is made of a plastic material, and has the object-side surface 961 and the image-side surface 962 being both aspheric. Furthermore, the object-side surface 961 of the sixth lens element 960 includes at least one inflection point and at least one critical point in an off-axis region thereof. The IR-cut filter 970 is made of a glass material and located between the sixth lens element 960 and the image surface 980, and will not affect the focal length of the optical photographing lens assembly.

The detailed optical data of the 9th embodiment are shown in TABLE 17 and the aspheric surface data are shown in TABLE 18 below.

TABLE 17

9th Embodiment
f = 6.17 mm, Fno = 1.98, HFOV = 18.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.775 | | | | |
| 2 | Lens 1 | 1.884 | ASP | 1.033 | Plastic | 1.544 | 56.0 | 3.64 |
| 3 | | 31.571 | ASP | 0.060 | | | | |
| 4 | Lens 2 | 6.214 | ASP | 0.220 | Plastic | 1.614 | 26.0 | −8.70 |
| 5 | | 2.833 | ASP | 0.084 | | | | |
| 6 | Lens 3 | 3.791 | ASP | 0.608 | Plastic | 1.544 | 56.0 | 11.38 |
| 7 | | 9.229 | ASP | 0.324 | | | | |
| 8 | Lens 4 | 6.006 | ASP | 0.250 | Plastic | 1.614 | 26.0 | −5.62 |
| 9 | | 2.155 | ASP | 1.208 | | | | |
| 10 | Lens 5 | −12.297 | ASP | 0.260 | Plastic | 1.566 | 37.4 | −5.95 |
| 11 | | 4.673 | ASP | 0.064 | | | | |
| 12 | Lens 6 | 6.834 | ASP | 0.699 | Plastic | 1.681 | 18.6 | 9.15 |
| 13 | | −68.086 | ASP | 0.300 | | | | |
| 14 | IR-cut filter | Plano | | 0.175 | Glass | 1.517 | 64.2 | — |
| 15 | | Plano | | 0.540 | | | | |
| 16 | Image | Plano | | — | | | | |

Reference wavelength is 587.6 nm (d-line).
The maximum effective radius of the surface 10 is 1.200 mm.

TABLE 18

Aspheric Coefficients

| Surface # | 2 | 3 | 4 | 5 | 6 | 7 |
|---|---|---|---|---|---|---|
| k = | −1.0731E−01 | −9.9000E+01 | −4.2120E+01 | 2.1118E+00 | 6.5986E+00 | 3.3295E+01 |
| A4 = | 2.2855E−03 | −1.2737E−01 | −1.8220E−01 | 3.9660E−02 | 1.8839E−01 | 5.2360E−02 |
| A6 = | −1.2753E−02 | 2.7576E−01 | 3.9382E−01 | −1.4234E−01 | −3.9200E−01 | −1.6244E−01 |
| A8 = | 1.3528E−02 | −2.1697E−01 | −3.2609E−01 | 2.2227E−01 | 4.5822E−01 | 2.5173E−01 |
| A10 = | −6.2744E−03 | 8.0244E−02 | 1.3157E−01 | −1.1443E−01 | −2.2476E−01 | −1.9198E−01 |
| A12 = | 1.0525E−03 | −1.1345E−02 | −2.1040E−02 | 1.6522E−02 | 3.5129E−02 | 4.9438E−02 |

| Surface # | 8 | 9 | 10 | 11 | 12 | 13 |
|---|---|---|---|---|---|---|
| k = | 2.3688E+01 | 2.4534E+00 | −3.5299E+01 | −2.3095E+00 | −1.0000E+00 | −1.0000E+00 |
| A4 = | −1.1649E−01 | −1.2135E−01 | −1.0170E−01 | 8.4302E−02 | 8.8554E−02 | −6.0277E−02 |
| A6 = | −9.3353E−02 | 7.3983E−03 | −3.3484E−01 | −5.8593E−01 | −2.0090E−01 | 3.9618E−02 |
| A8 = | 3.1781E−01 | 1.7396E−01 | 7.3029E−01 | 1.0048E+00 | 1.8567E−01 | −2.7877E−02 |
| A10 = | −4.2474E−01 | −3.2382E−01 | −7.6410E−01 | −1.2482E+00 | −1.0578E−01 | 2.1832E−02 |
| A12 = | 2.2556E−01 | 2.4477E−01 | −1.3017E−01 | 1.0730E+00 | 4.6703E−02 | −1.0682E−02 |
| A14 = | −4.2388E−02 | −6.9097E−02 | 1.1689E+00 | −5.9984E−01 | −1.7842E−02 | 2.6512E−03 |
| A16 = | | | −1.1711E+00 | 2.0528E−01 | 4.9370E−03 | −3.0218E−04 |
| A18 = | | | 4.8696E−01 | −3.9297E−02 | −7.7389E−04 | 7.8080E−06 |
| A20 = | | | −7.2743E−02 | 3.2923E−03 | 4.9951E−05 | 8.8800E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f (mm) | 6.17 | Y41/Y51 | 0.79 |
| Fno | 1.98 | Y41/Y52 | 0.65 |
| HFOV (deg.) | 18.1 | Y41/Y61 | 0.55 |
| FOV | 36.20 | Y41/Y62 | 0.52 |
| Nmax | 1.681 | Y42/Y11 | 0.62 |

-continued

| 9th Embodiment | | | |
|---|---|---|---|
| V40 | 4 | Y42/Y12 | 0.68 |
| V30 | 3 | Y42/Y21 | 0.71 |
| V25 | 1 | Y42/Y22 | 0.81 |
| Sag11/CT1 | 0.76 | Y42/Y31 | 0.82 |
| ΣAT/(T34 + T45) | 1.14 | Y42/Y32 | 0.91 |
| BL/(T34 + T45) | 0.66 | Y42/Y51 | 0.81 |
| Td/BL | 4.74 | Y42/Y52 | 0.66 |
| TL (mm) | 5.82 | Y42/Y61 | 0.56 |
| TL/f | 0.94 | Y42/Y62 | 0.52 |
| Y11/Y62 | 0.84 | Sag11/R1 | 0.41 |
| Y41/Y11 | 0.61 | f/R8 | 2.86 |
| Y41/Y12 | 0.67 | f4/|f2| | −0.65 |
| Y41/Y21 | 0.70 | f4/|f3| | −0.49 |
| Y41/Y22 | 0.80 | f4/|f5| | −0.94 |
| Y41/Y31 | 0.81 | f4/|f6| | −0.61 |
| Y41/Y32 | 0.90 | f/ImgH | 3.03 |

10th Embodiment

Figure 20:
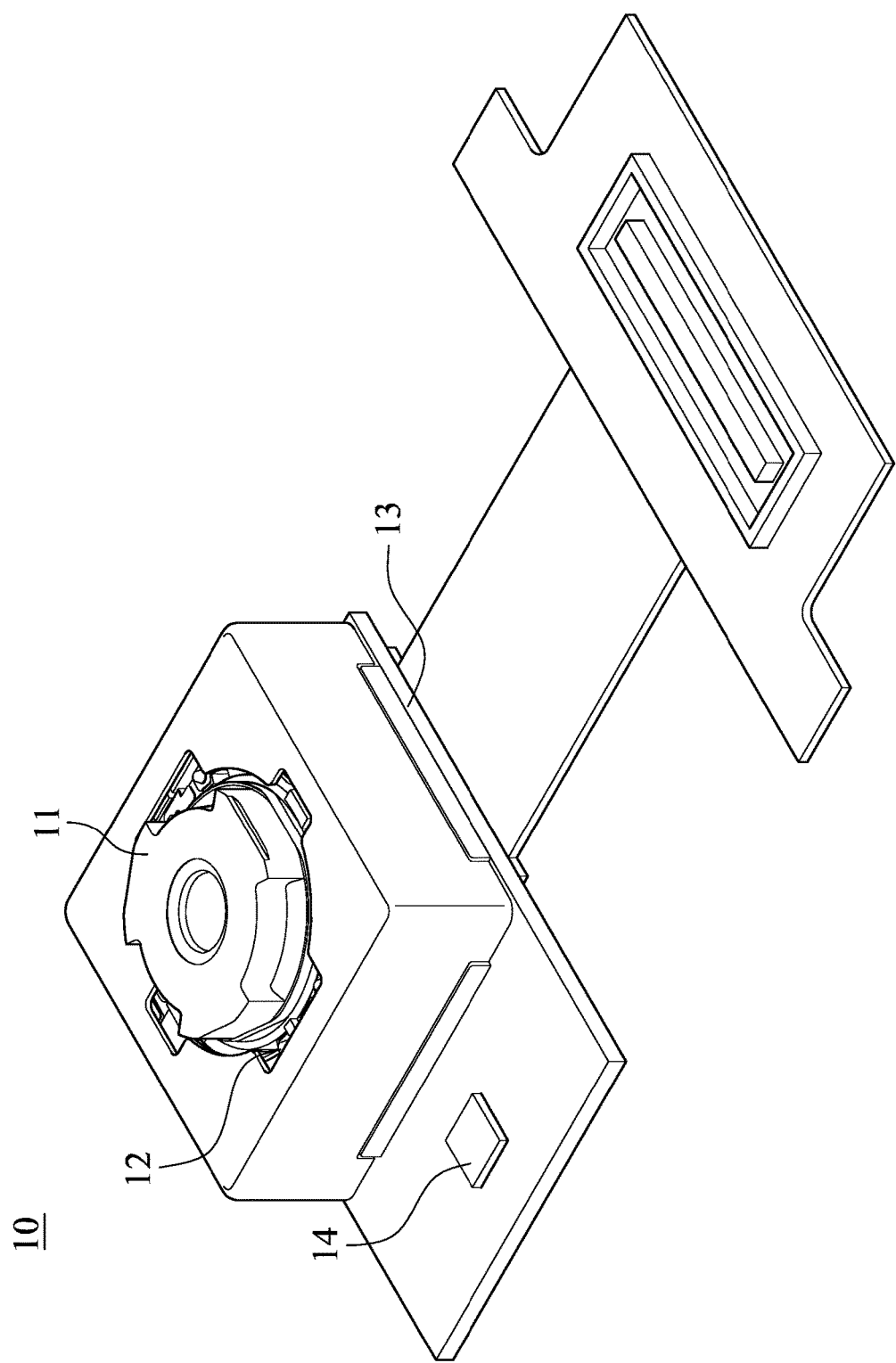
FIG. 20 is a three-dimensional view of an imaging apparatus according to the 10th embodiment of the present disclosure.

FIG. 20 is a three-dimensional view of an imaging apparatus 10 according to the 10th embodiment of the present disclosure. In FIG. 20, the imaging apparatus 10 according to the 10th embodiment is a camera module. The imaging apparatus 10 includes an imaging lens module 11, a driving assembly 12 and an image sensor 13, wherein the imaging lens module 11 includes the optical photographing lens assembly according to the 1st embodiment and a barrel (its reference numeral is omitted) for carrying the optical photographing lens assembly. An image of an imaged object can be captured by the imaging apparatus 10 via the imaging lens module 11, the driving assembly 12 is used to bring the image into focus so that the image can be clearly formed on the image sensor 13, and then the data of the image is outputted.

The driving assembly 12 can have an auto-focus functionality, and a driving method thereof can use a voice coil motor (VCM), a micro electro-mechanical system (MEMS), a piezoelectric system or a shape memory alloy system. The driving assembly 12 enables the optical photographing lens assembly to obtain a preferable imaging position, so that the imaged object in different object distances can be imaged clearly.

The image sensor 13 of the imaging apparatus 10 can have the properties of high photosensitivity and low noise (such as CMOS and CCD) and is disposed on the image surface of the optical photographing lens assembly, so that the excellent image quality of the optical photographing lens assembly can be truly presented.

Moreover, the imaging apparatus 10 can further include an image stabilizing module 14. The image stabilizing module 14 can exemplarily include an accelerator, a gyroscope or a Hall Effect sensor. In the 10th embodiment, the image stabilizing module 14 is a gyroscope. However, it is only exemplary and the image stabilizing module 14 is not limited thereto. By adjusting the changes in different axial directions of the optical photographing lens assembly, the blurry image due to motion during exposure can be compensated, so that the image quality of dynamic scenes or low-light scenes can be enhanced. Moreover, the advanced image compensation functions, such as optical image stabilization (OIS) or electronic image stabilization (EIS), can be provided.

11th Embodiment

Figure 21A:
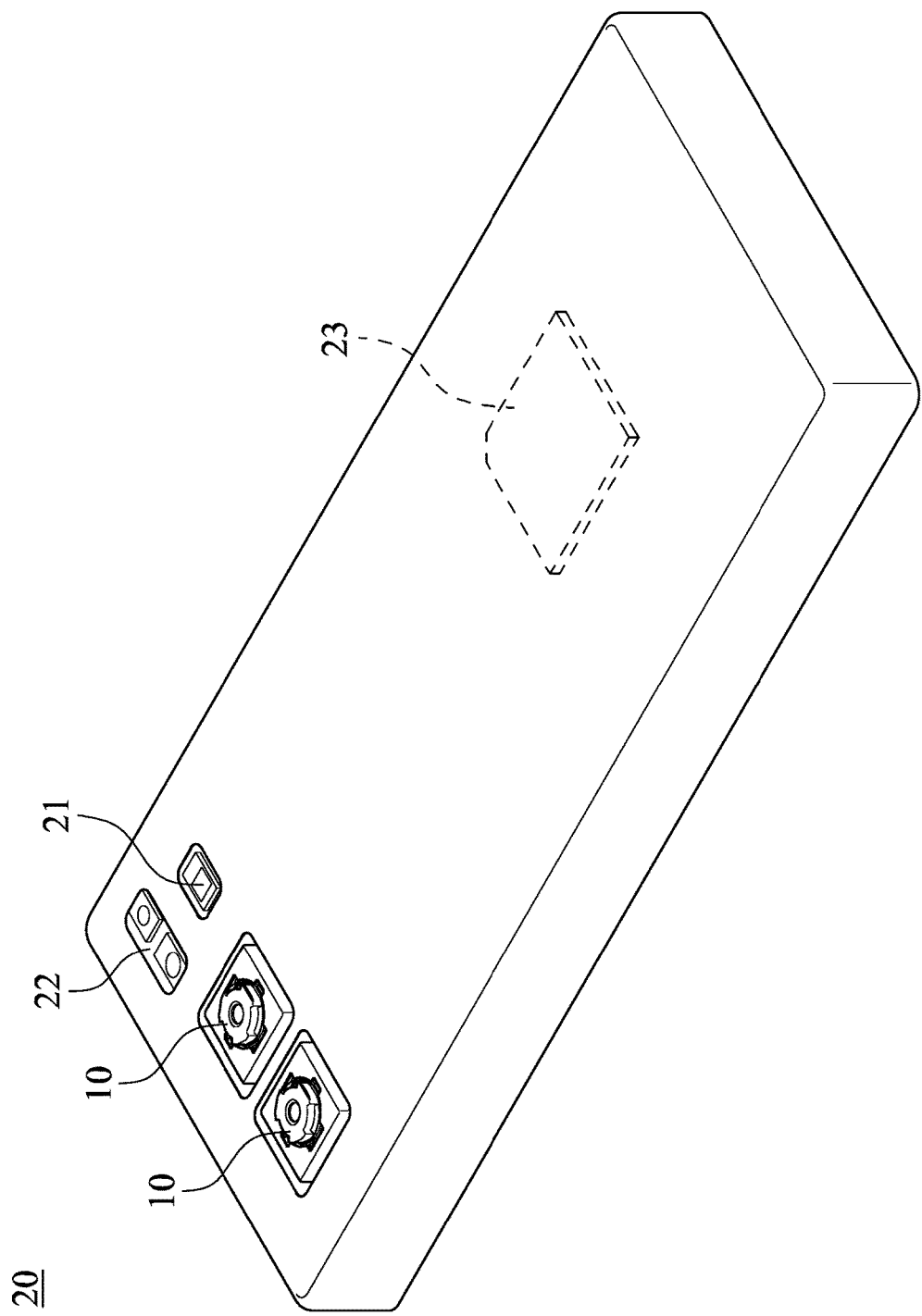
FIG. 21A is a schematic view showing a side of an electronic device according to the 11th embodiment of the present disclosure.
Figure 21B:
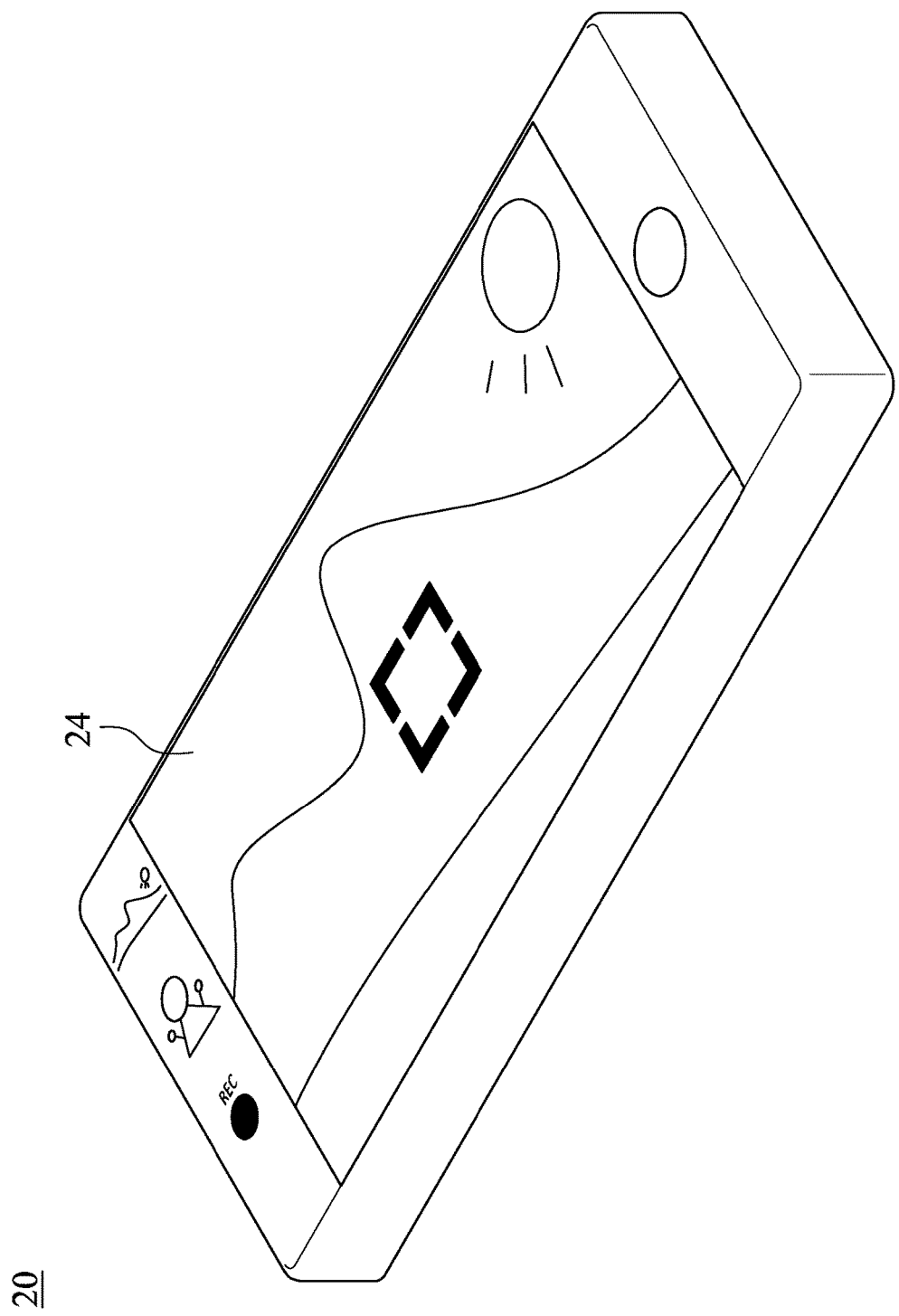
FIG. 21B is a schematic view showing another side of the electronic device in FIG. 21A.
Figure 21C:
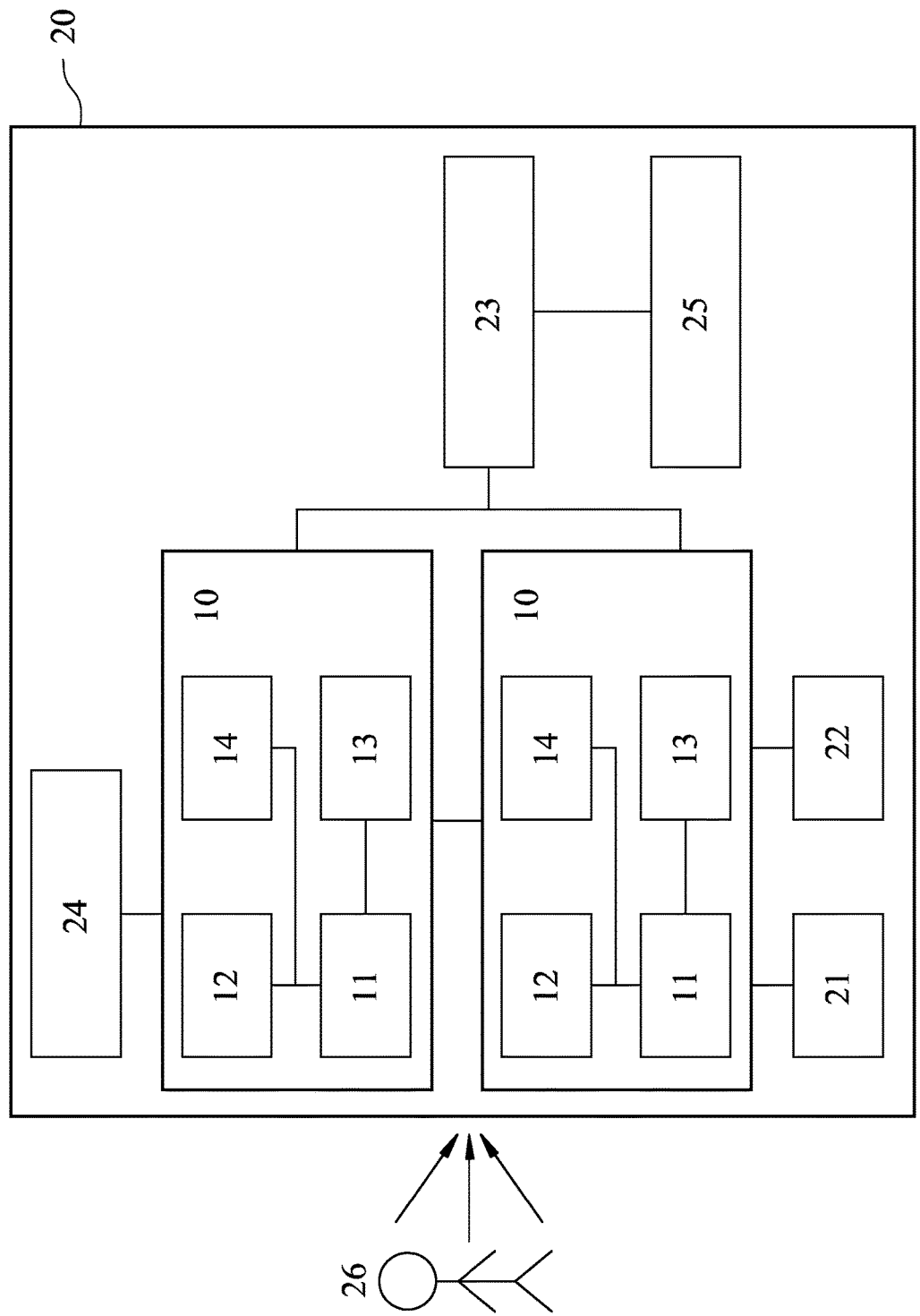
FIG. 21C is a block diagram of the electronic device in FIG. 21A.

FIG. 21A is a schematic view showing a side of an electronic device 20 according to the 11th embodiment of the present disclosure. FIG. 21B is a schematic view showing another side of the electronic device 20 in FIG. 21A. FIG. 21C is a block diagram of the electronic device 20 in FIG. 21A. In FIG. 21A, FIG. 21B and FIG. 21C, the electronic device 20 of the 11th embodiment is a smartphone. The electronic device 20 includes two imaging apparatus 10, a flash module 21, an auxiliary focusing module 22, an image signal processor 23, a user interface 24 and an image software processor 25. When a user takes a photograph via the user interface 24, light rays of the imaged object 26 are focused by the electronic device 20 via the imaging apparatus 10 for generating an image. Meanwhile, a light compensation function is provided by the flash module 21, the object distance of the imaged objected 26 is provided by the auxiliary focusing module 22 for quick focusing, and an optimized image processing is provided by the image signal processor 23 and the image software processor 25, so that the image quality of the optical photographing lens assembly can be further enhanced. The auxiliary focusing module 22 can adopt conventional infrared or laser for quick focusing. The user interface 24 can adopt a touch screen or a physical button, and an image software processor 25 can be coordinated with the user interface 24 for providing a variety of shooting modes and a variety of image processing modifications.

Both of two imaging apparatus 10 of the 11th embodiment are the same as the imaging apparatus 10 of the 10th embodiment, and will not be repeated herein.

12th Embodiment

Figure 22:
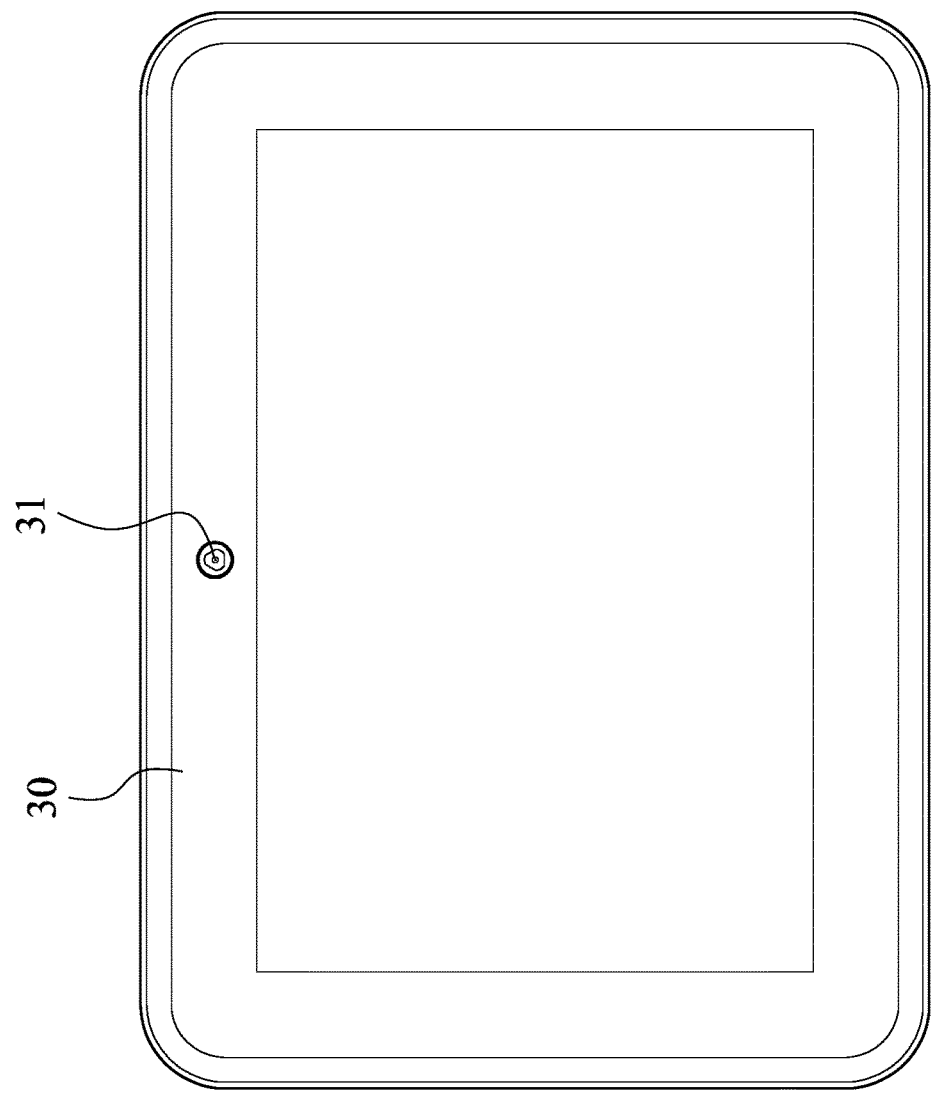
FIG. 22 is a schematic view of an electronic device according to the 12th embodiment of the present disclosure.

FIG. 22 is a schematic view of an electronic device 30 according to the 12th embodiment of the present disclosure. The electronic device 30 of the 12th embodiment is a tablet personal computer. The electronic device 30 includes an imaging apparatus 31. The imaging apparatus 31 can be the same as that of the 10th embodiment, and will not be repeated herein.

13th Embodiment

Figure 23:
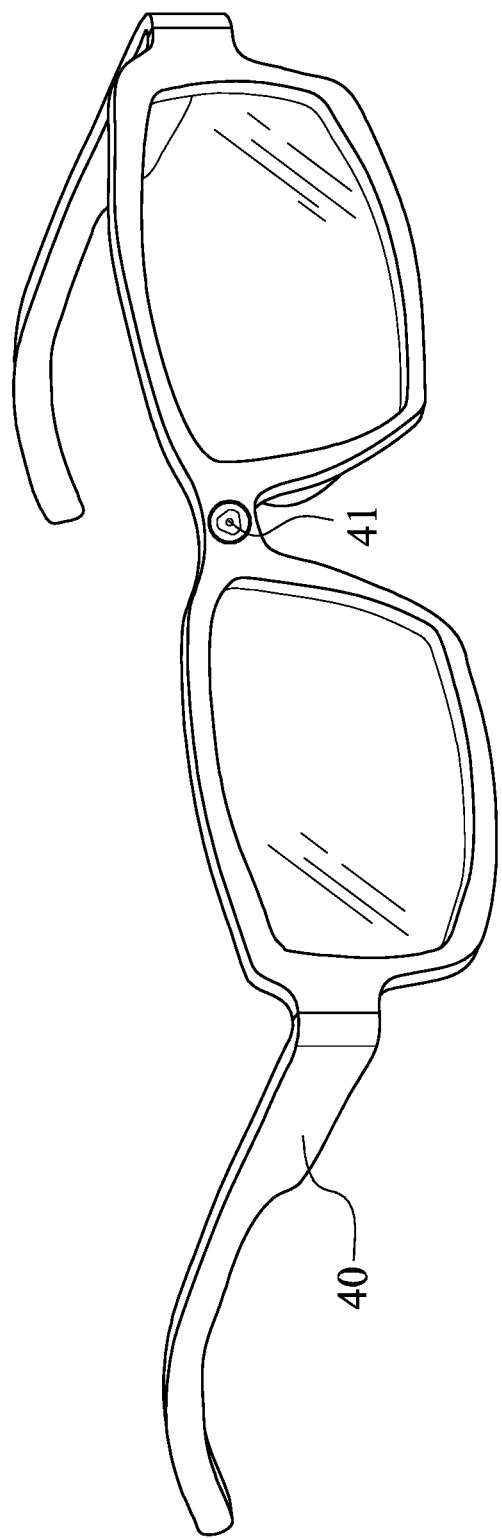
FIG. 23 is a schematic view of an electronic device according to the 13th embodiment of the present disclosure.

FIG. 23 is a schematic view of an electronic device 40 according to the 13th embodiment of the present disclosure. The electronic device 40 of the 13th embodiment is a wearable device. The electronic device 40 includes an imaging apparatus 41. The imaging apparatus 41 can be the same as that of the 10th embodiment, and will not be repeated herein.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising six lens elements, the six lens elements being, in order from an object side to an image side:
    a first lens element, a second lens element, a third lens element, a fourth lens element, a fifth lens element and a sixth lens element;
    wherein the first lens element has positive refractive power; the second lens element has negative refractive power; the fourth lens element has negative refractive power and has an image-side surface being concave in a paraxial region thereof; the fifth lens element has an object-side surface being concave in a paraxial region thereof; and the sixth lens element has an image-side surface being convex in a paraxial region thereof, both an object-side surface and the image-side surface of the sixth lens element are aspheric, and at least one of the object-side surface and the image-side surface of the sixth lens element comprises at least one inflection point;

wherein a focal length of the second lens element is f2, a focal length of the fourth lens element is f4, a focal length of the optical photographing lens assembly is f, an axial distance between an object-side surface of the first lens element and an image surface is TL, a total number of lens elements having Abbe numbers less than 40 is V40, and the following conditions are satisfied:

$-0.90 < f4/|f2| \le 0;$ $0.50 < TL/f < 1.0;$ and $3 \le V40.$

2. The optical photographing lens assembly of claim 1, wherein the fifth lens element has positive refractive power, and the sixth lens element has negative refractive power.

3. The optical photographing lens assembly of claim 1, wherein the focal length of the second lens element is f2, the focal length of the fourth lens element is f4, and the following condition is satisfied:

$-0.70 < f4/|f2| \le 0.$

4. The optical photographing lens assembly of claim 1, wherein an axial distance between the object-side surface of the first lens element and the image-side surface of the sixth lens element is Td, an axial distance between the image-side surface of the sixth lens element and the image surface is BL, and the following condition is satisfied:

$2.5 < Td/BL < 10.$

5. The optical photographing lens assembly of claim 1, wherein at least one lens element of the fifth lens element and the sixth lens element has positive refractive power and an Abbe number less than 30.

6. The optical photographing lens assembly of claim 1, wherein a total number of lens elements having Abbe numbers less than 30 is V30, and the following condition is satisfied:

$3 \le V30.$

7. The optical photographing lens assembly of claim 1, wherein a maximum effective radius of an object-side surface of the fourth lens element has a smaller value than maximum effective radii of object-side surfaces and image-side surfaces of the first lens element, the second lens element, the third lens element, the fifth lens element and the sixth lens element, and a maximum effective radius of the image-side surface of the fourth lens element has a smaller value than maximum effective radii of object-side surfaces and image-side surfaces of the first lens element, the second lens element, the third lens element, the fifth lens element and the sixth lens element.

8. The optical photographing lens assembly of claim 1, wherein a focal length of the third lens element is f3, the focal length of the fourth lens element is f4, a focal length of the fifth lens element is f5, a focal length of the sixth lens element is f6, and the following conditions are satisfied:

$-1.0 < f4/|f3| < 0;$ $-1.0 < f4/|f5| < 0;$ and $-1.0 < f4/|f6| < 0.$

9. The optical photographing lens assembly of claim 1, wherein a sum of axial distances between every adjacent lens elements of the optical photographing lens assembly is ΣAT, an axial distance between the third lens element and the fourth lens element is T34, an axial distance between the fourth lens element and the fifth lens element is T45, and the following condition is satisfied:

$1.0 < \Sigma AT/(T34+T45) < 1.25.$

10. The optical photographing lens assembly of claim 1, wherein an axial distance between the image-side surface of the sixth lens element and the image surface is BL, an axial distance between the third lens element and the fourth lens element is T34, an axial distance between the fourth lens element and the fifth lens element is T45, and the following condition is satisfied:

$BL/(T34+T45) < 1.25.$

11. The optical photographing lens assembly of claim 1, wherein a maximum effective radius of the object-side surface of the first lens element is Y11, a maximum effective radius of the image-side surface of the sixth lens element is Y62, and the following condition is satisfied:

$0.80 < Y11/Y62 < 1.05.$

12. The optical photographing lens assembly of claim 1, wherein the third lens element has an object-side surface being convex in a paraxial region thereof and an image-side surface being concave in a paraxial region thereof.

13. The optical photographing lens assembly of claim 1, wherein the focal length of the optical photographing lens assembly is f, a curvature radius of the image-side surface of the fourth lens element is R8, and the following condition is satisfied:

$2.5 < f/R8 < 4.0.$

14. The optical photographing lens assembly of claim 1, wherein a displacement in parallel with an optical axis from an axial vertex on the object-side surface of the first lens element to a maximum effective radius position of the object-side surface of the first lens element is Sag11, a central thickness of the first lens element is CT1, and the following condition is satisfied:

$0.60 < Sag11/CT1 < 1.10.$

15. The optical photographing lens assembly of claim 1, wherein a displacement in parallel with an optical axis from an axial vertex on the object-side surface of the first lens element to a maximum effective radius position of the object-side surface of the first lens element is Sag11, a curvature radius of the object-side surface of the first lens element is R1, and the following condition is satisfied:

$0.30 < Sag11/R1 < 0.50.$

16. The optical photographing lens assembly of claim 1, wherein the focal length of the optical photographing lens assembly is f, and a maximum image height of the optical photographing lens assembly is ImgH, a maximum field of view of the optical photographing lens assembly is FOV, and the following conditions are satisfied:

$2.5 < f/ImgH < 4.5;$ and 20 degrees $< FOV < 50$ degrees.

17. The optical photographing lens assembly of claim 1, wherein an f-number of the optical photographing lens assembly is Fno, the axial distance between the object-side surface of the first lens element and the image surface is TL, and the following conditions are satisfied:

$1.20 < Fno < 2.50;$ and $TL < 7.0$ mm.

18. The optical photographing lens assembly of claim 1, wherein the sixth lens element has negative refractive power, a maximum of refractive indexes of all the lens elements of the optical photographing lens assembly is Nmax, and the following condition is satisfied:

$$N\max<1.75.$$

19. The optical photographing lens assembly of claim 1, wherein at least one of the object-side surface and the image-side surface of the sixth lens element comprises at least one critical point in an off-axis region thereof.

20. An imaging apparatus, comprising:
the optical photographing lens assembly of claim 1; and
an image sensor, wherein the image sensor is disposed on the image surface of the optical photographing lens assembly.

21. An electronic device, comprising:
the imaging apparatus of claim 20.

22. An optical photographing lens assembly comprising six lens elements, the six lens elements being, in order from an object side to an image side:
a first lens element, a second lens element, a third lens element, a fourth lens element, a fifth lens element and a sixth lens element;
wherein the first lens element has positive refractive power; the fourth lens element has negative refractive power; the fifth lens element has an object-side surface being concave in a paraxial region thereof; and the sixth lens element has an image-side surface being convex in a paraxial region thereof, both an object-side surface and the image-side surface of the sixth lens element are aspheric, and at least one of the object-side surface and the image-side surface of the sixth lens element comprises at least one inflection point;
wherein a focal length of the second lens element is f2, a focal length of the third lens element is f3, a focal length of the fourth lens element is f4, a focal length of the fifth lens element is f5, a focal length of the sixth lens element is f6, a focal length of the optical photographing lens assembly is f, an axial distance between an object-side surface of the first lens element and an image surface is TL, a total number of lens elements having Abbe numbers less than 40 is V40, and the following conditions are satisfied:

$$-0.90<f4/|f2|<0;$$

$$-1.0<f4/|f3|<0;$$

$$-1.0<f4/|f5|<0;$$

$$-1.0<f4/|f6|<0;$$

$$0.50<TL/f<1.0; \text{ and}$$

$$3\le V40.$$

23. The optical photographing lens assembly of claim 22, wherein the fifth lens element has positive refractive power, and the sixth lens element has negative refractive power.

24. The optical photographing lens assembly of claim 22, wherein the focal length of the second lens element is f2, the focal length of the fourth lens element is f4, and the following condition is satisfied:

$$-0.70<f4/|f2|<0.$$

25. The optical photographing lens assembly of claim 22, wherein an axial distance between the object-side surface of the first lens element and the image-side surface of the sixth lens element is Td, an axial distance between the image-side surface of the sixth lens element and the image surface is BL, and the following condition is satisfied:

$$2.5<Td/BL<10.$$

26. The optical photographing lens assembly of claim 22, wherein at least one lens element of the fifth lens element and the sixth lens element has positive refractive power and an Abbe number less than 30.

27. The optical photographing lens assembly of claim 22, wherein a total number of lens elements having Abbe numbers less than 30 is V30, and the following condition is satisfied:

$$3\le V30.$$

28. The optical photographing lens assembly of claim 22, wherein a maximum effective radius of an object-side surface of the fourth lens element has a smaller value than maximum effective radii of object-side surfaces and image-side surfaces of the first lens element, the second lens element, the third lens element, the fifth lens element and the sixth lens element, and a maximum effective radius of an image-side surface of the fourth lens element has a smaller value than maximum effective radii of object-side surfaces and image-side surfaces of the first lens element, the second lens element, the third lens element, the fifth lens element and the sixth lens element.

29. The optical photographing lens assembly of claim 22, wherein the fourth lens element has an image-side surface being concave in a paraxial region thereof.

30. The optical photographing lens assembly of claim 22, wherein a sum of axial distances between every adjacent lens elements of the optical photographing lens assembly is ΣAT, an axial distance between the third lens element and the fourth lens element is T34, an axial distance between the fourth lens element and the fifth lens element is T45, and the following condition is satisfied:

$$1.0<\Sigma AT/(T34+T45)<1.25.$$

31. The optical photographing lens assembly of claim 22, wherein an axial distance between the image-side surface of the sixth lens element and the image surface is BL, an axial distance between the third lens element and the fourth lens element is T34, an axial distance between the fourth lens element and the fifth lens element is T45, and the following condition is satisfied:

$$BL/(T34+T45)<1.25.$$

32. The optical photographing lens assembly of claim 22, wherein a maximum effective radius of the object-side surface of the first lens element is Y11, a maximum effective radius of the image-side surface of the sixth lens element is Y62, and the following condition is satisfied:

$$0.80<Y11/Y62<1.05.$$

33. The optical photographing lens assembly of claim 22, wherein the third lens element has an object-side surface being convex in a paraxial region thereof and an image-side surface being concave in a paraxial region thereof.

34. The optical photographing lens assembly of claim 22, wherein a displacement in parallel with an optical axis from an axial vertex on the object-side surface of the first lens element to a maximum effective radius position of the object-side surface of the first lens element is Sag11, a central thickness of the first lens element is CT1, and the following condition is satisfied:

$$0.60<Sag11/CT1<1.10.$$

35. The optical photographing lens assembly of claim 22, wherein a displacement in parallel with an optical axis from an axial vertex on the object-side surface of the first lens element to a maximum effective radius position of the object-side surface of the first lens element is Sag11, a curvature radius of the object-side surface of the first lens element is R1, and the following condition is satisfied:

$0.30 < Sag11/R1 < 0.50$.

36. The optical photographing lens assembly of claim 22, wherein the focal length of the optical photographing lens assembly is f, and a maximum image height of the optical photographing lens assembly is ImgH, a maximum field of view of the optical photographing lens assembly is FOV, and the following conditions are satisfied:

$2.5 < f/ImgH < 4.5$; and 20 degrees $<$ FOV $<$ 50 degrees.

37. The optical photographing lens assembly of claim 22, wherein an f-number of the optical photographing lens assembly is Fno, the axial distance between the object-side surface of the first lens element and the image surface is TL, and the following conditions are satisfied:

$1.20 < Fno < 2.50$; and

TL $<$ 7.0 mm.

38. The optical photographing lens assembly of claim 22, wherein the sixth lens element has negative refractive power, a maximum of refractive indexes of all the lens elements of the optical photographing lens assembly is Nmax, and the following condition is satisfied:

$N\max < 1.75$.

39. The optical photographing lens assembly of claim 22, wherein at least one of the object-side surface and the image-side surface of the sixth lens element comprises at least one critical point in an off-axis region thereof.

40. An imaging apparatus, comprising:
the optical photographing lens assembly of claim 22; and
an image sensor, wherein the image sensor is disposed on the image surface of the optical photographing lens assembly.

41. An electronic device, comprising:
the imaging apparatus of claim 40.

* * * * *